United States Patent
Childress

(10) Patent No.: US 12,440,588 B2
(45) Date of Patent: Oct. 14, 2025

(54) ULTRAVIOLET LIGHT CLEANING SYSTEMS AND METHODS OF USE

(71) Applicant: THE BOEING COMPANY, Chicago, IL (US)

(72) Inventor: Jamie J. Childress, Mercer Island, WA (US)

(73) Assignee: THE BOEING COMPANY, Arlington, VA (US)

( * ) Notice: Subject to any disclaimer, the term of this patent is extended or adjusted under 35 U.S.C. 154(b) by 683 days.

(21) Appl. No.: 17/480,950

(22) Filed: Sep. 21, 2021

(65) Prior Publication Data

US 2022/0160913 A1    May 26, 2022

Related U.S. Application Data

(60) Provisional application No. 63/116,664, filed on Nov. 20, 2020.

(51) Int. Cl.
*A61L 2/10* (2006.01)
*A61L 2/24* (2006.01)

(52) U.S. Cl.
CPC ............. *A61L 2/10* (2013.01); *A61L 2/24* (2013.01); *A61L 2202/11* (2013.01); *A61L 2202/14* (2013.01); *A61L 2202/15* (2013.01)

(58) Field of Classification Search
CPC ........................................................ A61L 2/10
See application file for complete search history.

(56) References Cited

U.S. PATENT DOCUMENTS

| | | | |
|---|---|---|---|
| 2011/0291995 A1* | 12/2011 | Shr | E05B 1/0069 250/492.1 |
| 2015/0273093 A1 | 10/2015 | Holub et al. | |
| 2018/0236113 A1 | 8/2018 | Gross et al. | |
| 2019/0298868 A1* | 10/2019 | Kishi | A61L 2/10 |
| 2021/0196848 A1* | 7/2021 | Baarman | A61L 2/26 |

FOREIGN PATENT DOCUMENTS

| | | |
|---|---|---|
| CN | 206081140 | 4/2017 |
| JP | 2020063049 A | 4/2020 |
| WO | 2014/078324 A1 | 5/2014 |

OTHER PUBLICATIONS

European Patent Office, Extended European Search Report for Application 21202679.3-1101 dated Jul. 4, 2022.

(Continued)

*Primary Examiner* — Kevin Joyner
(74) *Attorney, Agent, or Firm* — MH2 Technology Law Group LLP

(57) ABSTRACT

The present disclosure provides a cleaning system that includes an ultraviolet (UV) light source configured to emit a UV light in a predetermined wavelength range and a target having a predetermined transparency to the predetermined wavelength range. The cleaning system may further include a contact element removably coupled to the target. The UV light source cleans the target, which is configured to cause motion of the contact element in response to force being applied to the target. The cleaning system can further include one or more reflectors or absorbers coupled to the target or the UV light source, or positioned relative to the target or the UV light source, as to control the emission of UV light.

20 Claims, 16 Drawing Sheets

(56) References Cited

OTHER PUBLICATIONS

European Patent Office, Communication Pursuant to Article 94(3) EPC for Application 21 202 679.3-1101 dated Nov. 10, 2023.
Communication Pursuant to Article 94(3) EPC issued Oct. 21, 2024 in corresponding EP Application No. 21202679.3, 4 pages.
First Notice of Office Action issued May 30, 2025 from corresponding Chinese Application No. 202111287634.6 (in both Chinese and English), 23 pages.
Second Notification of Office Action issued Jul. 31, 2025 from corresponding Chinese Application No. 202111287634.6 (in both Chinese and English), 27 pages.
Notice of Reasons for Refusal issued Jul. 29, 2025 in corresponding Japanese Application No. 2021-179362 (English translation provided), 12 pages.

* cited by examiner

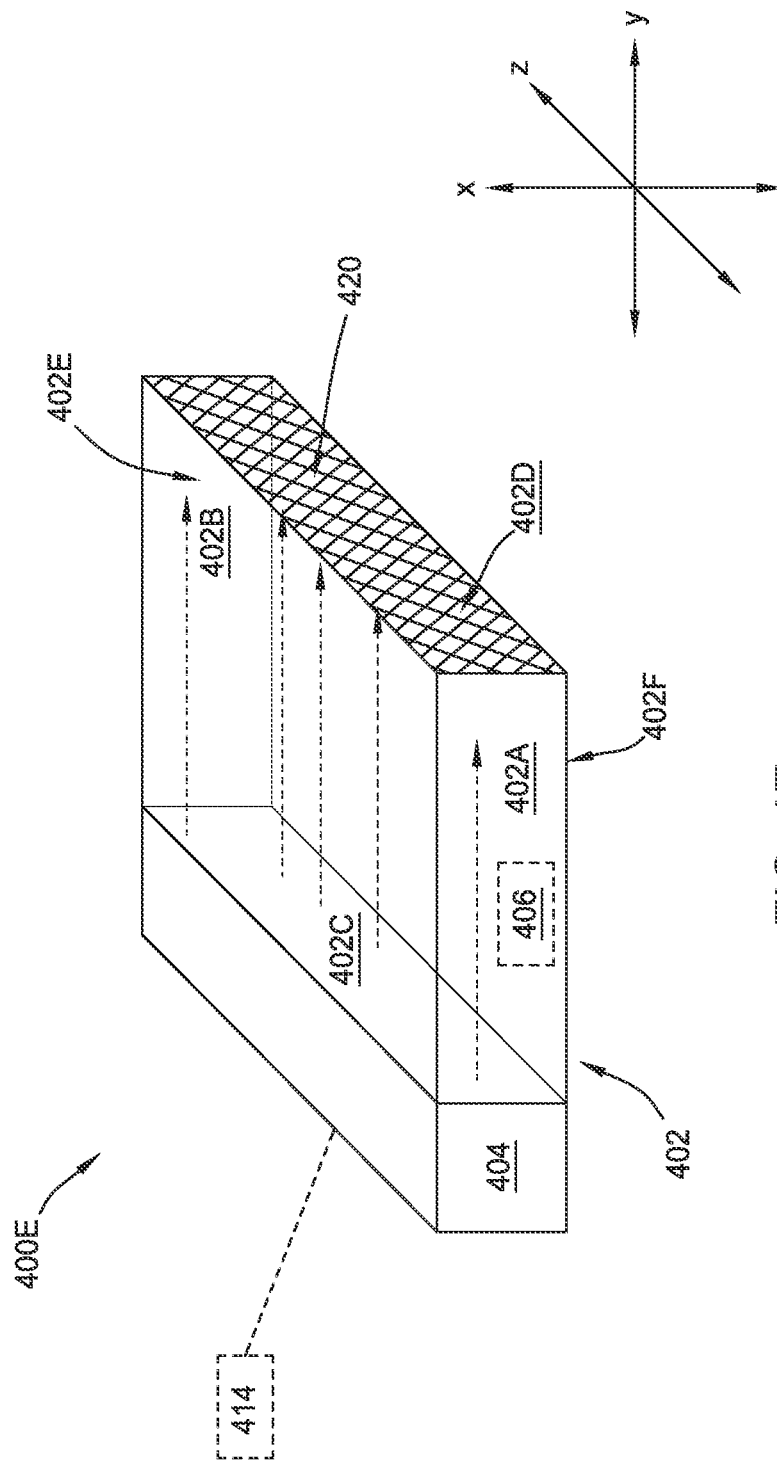

ULTRAVIOLET LIGHT CLEANING SYSTEMS AND METHODS OF USE

CROSS-REFERENCE TO RELATED APPLICATION(S)

This application claims benefit of and priority to U.S. Provisional Application No. 63/116,664, filed Nov. 20, 2020, of which is hereby expressly incorporated by reference herein in its entirety.

FIELD

Aspects of the present disclosure relate to the ability to use UV light for cleaning.

BACKGROUND

A multitude of users may make contact with equipment and furnishings in areas such as retail spaces, aircraft, or other transportation vehicles. This makes it challenging to clean that equipment between users, thus increasing the chance that undesirable elements such as dirt, bacteria, or viruses may be present on the equipment and furnishings. These undesirable elements may be transferred among and between users who make contact with the equipment and those with whom they have contact. Current solutions include those such as complete replacement of high-touch elements, or coating such high-touch elements with antimicrobial coatings. Such solutions are time-consuming and do not allow for easy retrofit. Thus, there remains a need for systems and methods of cleaning equipment that is used by numerous parties.

SUMMARY

The present disclosure provides a cleaning system, in one aspect, the cleaning system including: a target being at least 30% transparent to UV light in a wavelength range from about 222 nanometers (nm) to about 300 nm; and a contact element being removably coupled to the target and configured to cause motion of the contact element in response to force being applied to the target.

In one aspect, in combination with any example cleaning system above or below, the cleaning system includes the target which is at least about 30% transparent to UV light.

In one aspect, in combination with any example cleaning system above or below, the cleaning system includes the target which is from about 50% transparent to UV light to about 75% transparent to the UV light.

In one aspect, in combination with any example cleaning system above or below, the cleaning system includes a target formed from a transparent material having a UV transmission of from about 95 to about 99.15%.

In one aspect, in combination with any example cleaning system above or below, the cleaning system includes the target formed from a transparent material of borosilicate glass.

In one aspect, in combination with any example cleaning system above or below, the cleaning system includes the target which is from about 0.2 millimeters (mm) to about 20 centimeters (cm) in thickness.

In one aspect, in combination with any example cleaning system above or below, the cleaning system includes a target that is directly coupled to the contact element via an adhesive, a mechanical coupling, a magnetic coupling, a press-fit coupling, or combinations thereof.

In one aspect, in combination with any example cleaning system above or below, the cleaning system includes a target that is indirectly coupled to the contact element via a fixture.

In one aspect, in combination with any example cleaning system above or below, the cleaning system further includes a component in direct contact with and removably coupled to each of the contact element and the target.

In one aspect, in combination with any example cleaning system above or below, the cleaning system further includes an ultraviolet (UV) light source configured to emit UV light in a wavelength range from about 222 nm to about 254 nm.

In one aspect, in combination with any example cleaning system above or below, the cleaning system further includes a first reflector configured to reflect the UV light on to at least one surface of the target.

In one aspect, in combination with any example cleaning system above or below, the cleaning system includes the first reflector which is formed from a fluoropolymer.

In one aspect, in combination with any example cleaning system above or below, the cleaning system includes the first reflector which is formed from a material including a plurality of pores, each pore having a maximum diameter less than 222 nm.

In one aspect, in combination with any example cleaning system above or below, the cleaning system includes the target which has at least one target absorber configured to absorb UV light subsequent to the UV light passing through at least one surface of the target.

In one aspect, in combination with any example cleaning system above or below, the cleaning system includes the target which has a second reflector configured to reflect the UV light received from the UV light source in at least one direction through the target to direct the UV light towards at least one other surface of the target.

The present disclosure provides a cleaning system, in one aspect, the cleaning system including: an ultraviolet (UV) light source configured to emit a UV light in a wavelength range from about 222 nm to about 300 nm; a target being at least 30% transparent to UV light in a wavelength range from about 222 nanometers (nm) to about 300 nm; and a contact element being removably coupled to the target and configured to cause motion of the contact element in response to force being applied to the target.

In one aspect, in combination with any example cleaning system above or below, the cleaning system includes a target formed from a transparent material having a UV transmission of from about 95 to about 99.15%.

In one aspect, in combination with any example cleaning system above or below, the cleaning system includes the target formed from a transparent material of borosilicate glass.

In one aspect, in combination with any example cleaning system above or below, the cleaning system further includes a non-transitory medium configured to store a plurality of logic executable by a processor and including at least one cleaning program.

In one aspect, in combination with any example cleaning system above or below, the cleaning system further includes a sensor configured to detect a triggering event and the at least one cleaning program being configured to emit the UV light in response to the sensor detecting the triggering event.

In one aspect, in combination with any example cleaning system above or below, the cleaning system further includes that the sensor is associated with the target.

In one aspect, in combination with any example cleaning system above or below, the cleaning system includes that the sensor is associated with the UV light source.

In one aspect, in combination with any example cleaning system above or below, the cleaning system includes that the sensor is a type selected from: a temperature sensor, a pressure sensor, a timer, and combinations thereof.

The present disclosure provides a method of cleaning, in some aspects, the method of cleaning includes: detecting, by a sensor associated with a UV cleaning system, a first triggering event; and executing, by a processor, in response to detecting the first triggering event, a cleaning program to clean a target. In one aspect, executing the cleaning program includes: activating a UV light source of the UV cleaning system for a predetermined period of time, the UV light source being configured to emit to emit a UV light in a wavelength range from about 222 nm to about 300 nm to clean the target.

In one aspect, in combination with any example method above or below, subsequent to executing the cleaning program, engaging a contact element coupled to the target.

In one aspect, in combination with any example method above or below, the method further includes storing a first time associated with detecting the first triggering event, and a second time associated with executing the cleaning program on a data store, the data store being in wireless communication with the UV cleaning system.

In one aspect, in combination with any example method above or below, the activating of the UV light source includes causing the UV light source to emit UV light to clean at least one surface of a plurality of surfaces of the target.

In one aspect, in combination with any example method above or below, the method further includes reflecting, by a reflector coupled to the target, the UV light received from the UV light source.

In one aspect, in combination with any example method above or below, the method further includes configuring the UV light source to emit the UV light to clean a first surface of a plurality of surfaces of the target, and configuring the reflector to reflect the UV light through a second surface of the plurality of surfaces to clean the second surface.

In one aspect, in combination with any example method above or below, the method further includes that the executing of the cleaning program further includes: activating the UV light source for the predetermined period of time, the UV light source being configured to emit a predetermined range of wavelengths to clean a plurality of targets within a predetermined proximity of the UV light source.

In one aspect, in combination with any example method above or below, the method further includes that the first triggering event is: a predetermined time associated with a schedule; an activation of a contact element associated with a target; a predetermined time associated with a previous emission of UV light from the UV light source, or combinations thereof.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIGS. 4A-4F depict various configurations of cleaning systems according to aspects of the present disclosure.

DETAILED DESCRIPTION

Figure 1:
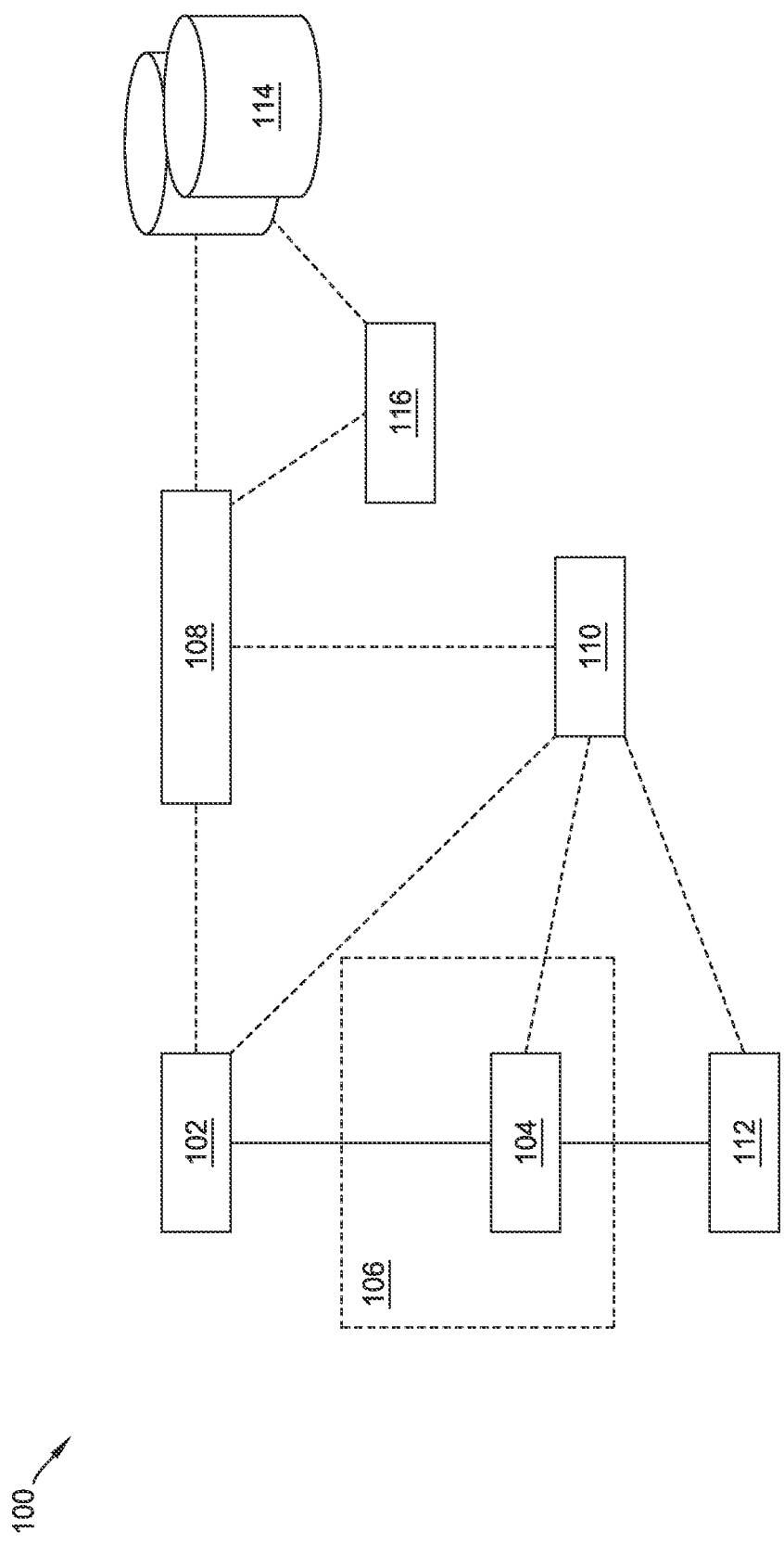
FIG. 1 depicts an example cleaning system according to aspects of the present disclosure.

The present disclosure relates to cleaning systems and methods of use of cleaning systems for the cleaning, e.g., the disinfection and sanitization, of one or more surfaces of a target using ultraviolet (UV) light. The cleaning systems can be located in various "installation environments" including public or private transportation vehicles (aerospace vehicles such as aircraft, spacecraft, marine vehicles, or the like, and non-aerospace transportation vehicles such as busses, cars, trains, boats), retail locations, financial institutions, casinos, non-casino gaming environments (e.g., e-sports), or other locations. The cleaning discussed herein can, in some examples, include sterilization. As used herein, "sterilization" is a process that makes one or more surfaces of a component free from bacteria, viruses, fungi, or other living microorganisms. The targets discussed herein are formed from one or more materials capable of being cleaned using UV light, and are removably coupled to contact elements to provide users with a clean surface to contact during use of the contact element. In this manner, such targets can, in embodiments, be retrofitted, thereby saving the labor and cost of replacing the contact elements. The "contact elements" discussed herein may be active elements which can cause an event such as a door opening or closing, a toilet flushing, or a door locking or unlocking, or static elements such as countertops or furniture. The contact elements, without the targets being coupled thereto, may be contacted by multiple parties, such as seats, handles, levers, buttons, trash container covers, trays, counters, touch screens (GUIs), keyboards, or gaming consoles, in contrast with non- or low-contact surfaces such as ceilings or other harder-to-reach surfaces. This can cause dirt, bacteria, viruses, fungi, mold, mildew, and other undesirable elements to be spread among and between contact elements, as well as between users of those contact elements and non-users whom come into contact with the users of those contact elements. In some examples, such contact elements may be present on an aerospace vehicle such as a commercial airplane and can be static elements such as a countertop. The contact elements can further include components of aircrafts, such as those in the passenger cabin, crew areas, or cockpits, as well as other personal or commercial transportation vehicles, banking systems (ATMs), informational or point-of-sale kiosks touch-screens and/or keypads, card readers, or other surfaces or combinations of surfaces in retail stores, shopping malls, schools, offices, rental cars, ride shares, housing shares, financial institution, automated teller machines (in financial institutions or other locations), as well as gaming systems. As discussed herein, "gaming systems" are systems configured for gambling in casinos or for non-gambling environments such as all-ages arcades or home systems, including e-sports systems. It is further contemplated that other contact elements used in businesses including hospitals, hotels/motels/resorts, or other locations could employ the systems and methods discussed herein. Accordingly, the contact elements removably coupled to the targets can further include desktops, countertops, key boards, computer mice, touch screens/GUIs on kiosks or mobile devices, other areas of mobile devices and/or mobile device cases, clothes hangers, seating, cutlery, dishware, glassware, or other items including surfaces that may be touched by multiple parties during the course of use.

A target can include one or more surfaces, and UV light source(s) can be aimed towards the one or more surfaces of a target to clean the one or more surfaces. Depending upon the example, one or more reflectors or absorbers may be used to direct and/or reflect the UV light towards and through the target. The target can include an indication such as "UV cleaned" or a graphic symbol (such as labels including acrylic labels), or a combination of text and symbols, to indicate that the target is cleaned by UV light. In some examples, UV light may be used alone, and in other examples, UV light may be used in combination with one or more cleaning solvents to remove contaminants such as dirt and oils as well as biologic elements such as viruses and bacteria such that the cleaned surfaces are not likely to transmit biologic contaminants among and between users of the high-touch surfaces.

The contact elements can be removably coupled to targets formed from a UV transparent material. As discussed herein, "UV transparent" as used with respect to target materials, refers to materials that are transparent to or transmissive (capable of transmitting) to at least a predetermined percentage (%) of ultraviolet (UV) light within a predetermined wavelength. As used herein, "about" is to mean within +/−5% of a stated value, maximum value, or minimum value. For example, a target that is X % UV transparent is transparent to X % of wavelengths within a predetermined wavelength range. The predetermined wavelength ranges are discussed below.

As used herein, "removably coupled" means that the target can be coupled to and uncoupled from the contact element without causing damage to the contact element. In some examples, the target can be uncoupled from the contact element without causing damage to the target. The removably coupling enables the target to be replaced if it is damaged or as part of a routine maintenance schedule, or if the target is to be modified to reflect a different or updated brand or cleanliness indicator. The removable coupling of the target to the contact element may be via an adhesive, a mechanical coupling such as snaps, clips, hook-and-loop, threads, or pegs, a magnetic coupling, or through combinations of types of couplings. In some examples, the target is removably coupled to the contact element via direct coupling, wherein the target is in direct contact with the contact element. In this example, if the contact element is an active element, applying force to the target causes the contact element to execute an action as discussed herein.

In other examples, the target is removably coupled to the contact element via an intermediate element such that each of the target and the contact element is in direct contact with the intermediate element but are not in direct contact with each other. The intermediate element can be formed from a variety of materials selected as to not damage either the target or the contact element. In this example, if the contact element is an active element, applying force to the target causes the intermediate element to apply force to the contact element such that the contact element executes an action as discussed herein.

In still other examples, the target can be removably coupled to a fixture, which may or may not be directly and removably coupled to the contact element. An intermediate element may or may not be used in this example. The fixture can be configured in various manners as discussed below, such that the application of force to the target causes the fixture to apply force to the contact element, causing the contact element to execute a function as discussed herein. In some examples, the target can include one or more reflectors or absorbers which may be removably or permanently coupled to the target. In other examples, one or more reflectors or absorbers may be included inside of the target. The reflectors and/or absorbers can be used to direct light towards one or more surfaces of the target as discussed in detail below. In some examples, one or more reflectors or absorbers may be coupled to or positioned in relation to the UV light source to direct the emission of UV light from the UV light source.

The cleaning systems discussed herein including the targets can be configured in various manners. In some examples, the UV light may be on continuously, that is, until the UV target is removed and replaced. Accordingly, as used herein "continuous illumination" refers to a system configured to have the UV light source turned on (active) and continuously cleaning the UV target for a predetermined time period, up to and including one or more twenty-four hour time periods, which encompasses a period of time having more than one user contacting the target. In some examples, continuous illumination includes examples where the UV light source is active, for example, twenty-four hours a day, or during operational hours of the environment where the target is located, or when the target is in the presence of humans, to continuously clean the target. Continuous illumination may be used, for example, to clean targets associated with contact elements such as touch screens (GUIs), countertops, tabletops, or other surfaces where it may be more efficient for a business to continuously clean the associated target to maintain the cleanliness of the target.

The continuous illumination example is in contrast to other examples, such as a discreet or periodic illumination example, where the UV light source may be turned on and off manually or automatically for predetermined periods of time at various intervals according to a schedule. In still other examples, which can be combined with other examples herein, the discreet illumination example may include a cleaning system where the UV light source can be turned on (activated) via one or more triggers as determined by one or more sensors associated with the cleaning system.

As discussed herein, a sensor or other system component can be "associated with" any other component of the cleaning system by being removably coupled, a permanently coupled, or formed integrally with the component to detect one or more triggering events. A "permanently coupled" component such as a sensor can be formed separately from and then subsequently coupled to the cleaning system and used a plurality of times but cannot be removed from the cleaning system without causing damage to the cleaning system. An "integral" component of the cleaning systems, including an integral component of the target or UV light such as a reflector or absorber, can be molded, cast, or otherwise incorporated into the cleaning system or components thereof.

Example Cleaning System

FIG. 1 depicts a cleaning system 100 according to aspects of the present disclosure. The cleaning system 100 includes a UV light source 102 configured to emit UV light within a predetermined wavelength range towards a target 104. The target 104 is removably coupled to a contact element 112. In one example, the predetermined wavelength range is from about 200 nanometers (nm) to about 400 nm. In another example, the predetermined wavelength range is from about 200 nm to about 230 nm. In another example, the predetermined wavelength range is from about 222 nanometers nm to about 254 nm. In still another example, the predetermined wavelength range is from about 235 nm to about 280 nm. In yet another example, the predetermined wavelength range is from about 315 nm to about 400 nm.

The UV light source 102 may be configured in various forms, and may or may not include one or more reflectors or absorbers to direct the UV light towards the target 104. In one example, the UV light source 102 comprises a mercury vapor lamp. In another example, the UV light source 102 includes a plurality of light-emitting diodes (LEDs). In still another example, the UV light source 102 is an excimer lamp.

In some examples, the target 104 can be formed from a material that is at least 20% UV transparent to the predetermined wavelength range emitted by the UV light source 102. In other examples, the target 104 can be formed from a material that is at least 30% UV transparent to the predetermined wavelength range emitted by the UV light source 102. In other examples, the target 104 can be formed from a material that is at least 40% UV transparent to the predetermined wavelength range emitted by the UV light source 102. The target 104 can be formed from Si-glass, quartz, or other materials that have a predetermined percentage of UV transparency within a predetermined wavelength range. In embodiments, the target 104 comprises glass having a transmission greater than about 85%, or from about 85% to about 99.99%, or from about 90% to about 99.50% or from about 95 to about 99.15%, or from about 99 to about 99.15% within any of the wavelength ranges discussed herein, including at 222 nm. Examples of suitable glass include borosilicate glass, such as Corning® 7980.

The target 104 can have an indication coupled to or etch therein which indicates, via text, graphics, or a combination thereof (for example, acrylic labels), that the target 104 is cleaned via UV light. The target 104 is removably coupled to the contact element 112 such that the target 104 can be removed and replaced according to a maintenance schedule, or in the event that it is damaged. In other examples, the target 104 can be uncoupled from the contact element 112 if the contact element 112 is damaged and the target 104 could then be re-coupled to a different contact element or to the contact element 112 after repair/refurbishment.

The target 104 can be removably and directly coupled to the contact element 112 via one of more of an adhesive (which may be pressure- or thermally-activated), a mechanical coupling such as snaps, clips, hook-and-loop, threads, or pegs, a magnetic coupling, or through combinations of types of couplings. The target 104 can have varying geometries and can have a thickness from about 0.2 millimeters (mm) to about 20 centimeters (cm), discussed in detail below. As discussed above, the target 104 can also be removably coupled to a component 106 which may or may not include an intermediate element or a movable fixture discussed in detail below. When a component 106 is used in conjunction with a target 104 and a contact element 112, the application of force to the target 104 causes movement of the component 106 which causes movement of the contact element 112. The contact element 112 may be a static or active element as discussed above, and can be formed from one or more of a polymer, elastomer, metal, alloy, organic material, composite material, or combination of materials.

The cleaning system 100 can further include one or more sensors 110, a server computer 108 having a non-transitory medium configured to store a plurality of executable logic, a mobile device 116, and one or more data stores 114. The plurality of logic includes at least one cleaning program. Each cleaning program includes parameters such as which UV light source 102 to activate, if more than one is included in the cleaning system 100, a predetermined period of time for which to activate the UV light source 102, a predetermined wavelength or wavelength range to be emitted by the UV light source 102, one or more triggers associated with the activation and deactivation of the UV light source 102, a continuous illumination instruction, and/or other parameters depending upon the configuration and use of the cleaning system 100. In some aspects of the present disclosure, the use of the cleaning system 100, including the cleaning program executed and the parameters of its execution, such as the time of execution and other factors, can be stored on the data stores 114 and further analyzed. The stored data can be used, for example, to improve or modify cleaning programs, or to develop additional cleaning programs.

The one or more sensors 110 can be configured to detect a triggering event, and the at least one cleaning program is configured to emit the UV light from the UV light source 102 in response to the sensor 110 detecting the triggering event. In one example, the sensor 110 is associated with the target 104. In another example, the sensor 110 is associated with the UV light source 102. It may be associated to one or both or the target 104 or the UV light source 102 by being removably coupled, permanently coupled, or formed integrally with the target 104 or the UV light source 102. In some examples, the sensor 110 may be coupled to a reflector or absorber that is coupled to, positioned in proximity to but not coupled to, or formed integrally with the target 104 or the UV light source 102. In another example, the sensor 110 can be a separate, remote element configured to detect use of the target, or other triggering events. Depending upon the example, the sensor 110 can be one or more of a temperature sensor, a pressure sensor, a timer, and combinations thereof.

The mobile device 116 can be a phone, tablet, wearable technology (watch, jewelry, heads-up display, clothing, glasses, etc.), personal data assistant, laptop, or a hybrid device. The mobile device 116 can be used to communicate with the server computer 108 and/or the data stores 114 to cause the activation of the cleaning system 100 and/or to record and analyze the operation of the cleaning system 100.

Example Method of Using Cleaning System

Figure 2:
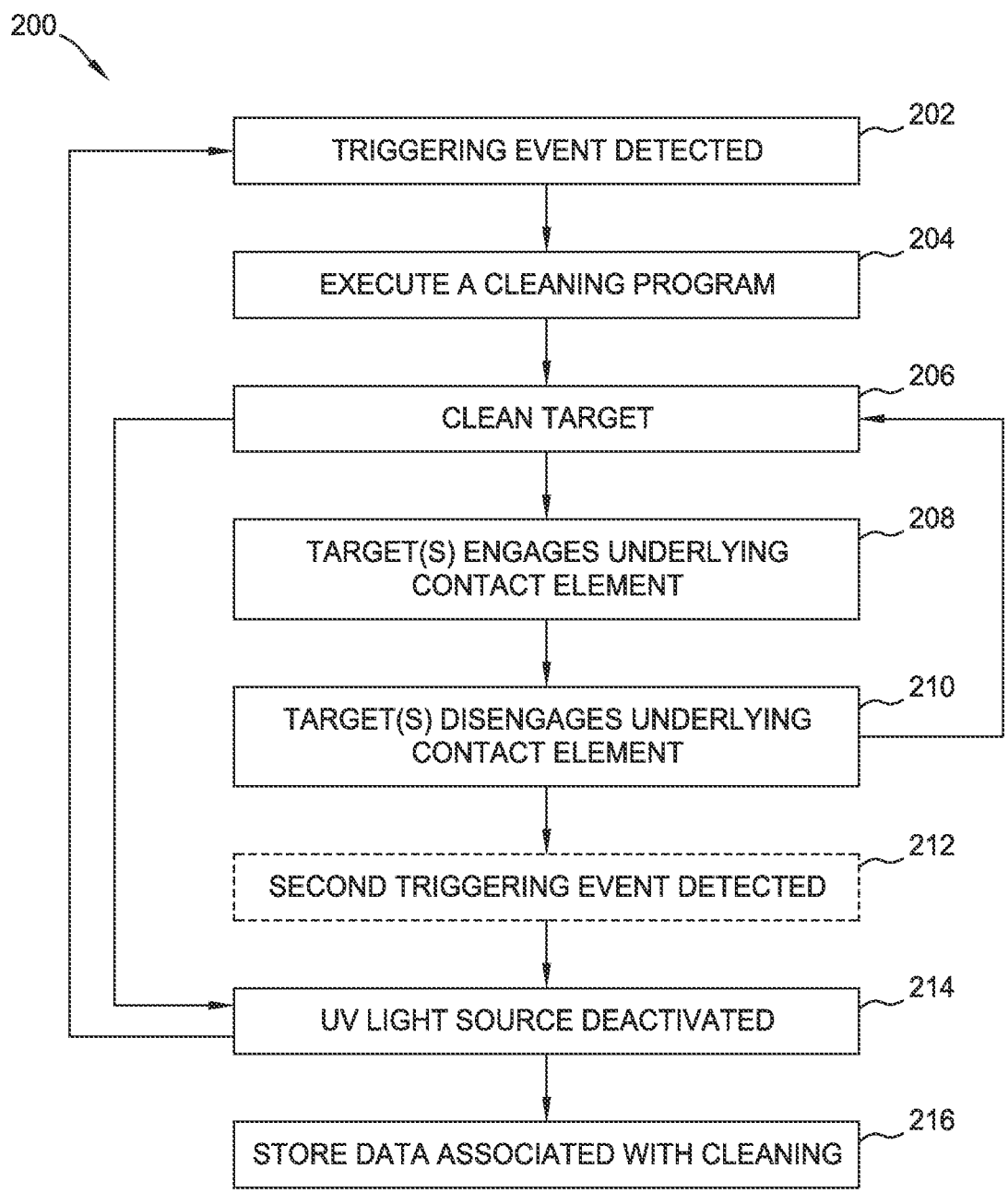
FIG. 2 depicts a flow chart of a method of cleaning according to aspects of the present disclosure.

FIG. 2 depicts a flow chart of a method of cleaning 200. At operation 202, a triggering event is detected by a sensor associated with a UV cleaning system, which may be similar to the cleaning system of FIG. 1 (202—Triggering event detected). At operation 204, in response to detecting the first triggering event, a cleaning program is executed to clean a target that is removably coupled to a contact element (204—Execute a cleaning program). As discussed herein, the target can be removably coupled to the target directly, using an intermediate element, using a fixture, or combinations thereof.

Executing the cleaning program at operation 204 includes activating a UV light source of the UV cleaning system for a predetermined period of time. At operation 206, the target is cleaned when the UV light source emits UV light towards the target (206—Clean target). As discussed herein, the UV light source is configured to emit to emit a UV light in a predetermined wavelength range to clean at least one surface of a plurality of surfaces of the target. In some examples, the predetermined wavelength range may be from about 200 nm to about 360 nm. In other examples, the predetermined wavelength range may be from about 210 nm to about 320 nm. In some examples, the predetermined wavelength range may be from about 222 nm to about 300 nm. The triggering event can include a sensor detecting a rise or drop in temperature within a predetermined distance of the target or UV light source, a pressure sensor detecting use of a target and the underlying contact element, a predetermined time associated with a schedule; an activation of a contact element associated with a target; a predetermined time associated with a previous emission of UV light from the UV light source, and combinations thereof.

In some examples, when there is a reflector coupled to the target, operation 206 further includes reflecting, by the reflector, the UV light received from the UV light source. In this example, the UV light source is configured to emit the UV light to clean a first surface of a plurality of surfaces of the target. Further in this example, one or more reflectors can be configured to reflect the UV light back through the first surface to re-clean the first surface. In some examples, which can be combined with other examples herein, the reflector can be configured to reflect the light through a second surface of the plurality of surfaces to clean the second surface.

In some examples, operation 204 further includes storing a first time associated with detecting the first triggering event, and a second time associated with executing the cleaning program on a data store, the data store being in wireless communication with the UV cleaning system. In some examples, executing the cleaning program at operation 204 further comprises activating the UV light source for the predetermined period of time, the UV light source being configured to emit a predetermined range of wavelengths to clean a plurality of targets within a predetermined proximity of the UV light source.

Further in the method 200, at operation 208, subsequent to executing the cleaning program, the contact element coupled to the target is engaged (208—Target(s) engages underlying contact element). At operation 210, subsequent to engaging the contact element at operation 208, the contact element is disengaged (210—Target(s) disengages underlying contact element). If the contact element is an active element, the engagement of the target at operation 208 may cause the movement of a lever, the activation of a button, the activation of a portion of a touch screen/GUI, or other action. If the contact element is a static element, the engagement of the target at operation 208 may include a user contacting the target with their hands/arms, stylus, or other implement. If the contact element is an active element, the disengagement of the target at operation 210 may be in response to the completion of an action. If the contact element is a static element, the disengagement of the target at operation 210 may include the user removing their hands/arms or stylus from the target.

In some examples, the cleaning program executed at operation 204 can cause the UV light source to be activated continuously. In this example, the method 200, as shown by the arrow from operation 210 to operation 206, the target is continuously cleaned by the UV light while the target is used to engage and disengage the contact element for a plurality of iterations. In other examples, the cleaning program executed at operation 204 can cause the UV light source to be activated and deactivated in response to triggering events. That is, the UV light source remains active and cleaning the target until an optional second triggering event occurs at operation 212 (212—Second triggering event detected). The UV light source can be deactivated at operation 214 (214—UV light source deactivated) and may be subsequently reactivated in response to future triggering events, as shown by the arrow from operation 212 to operation 202. In some example, at operation 216, a plurality of data associated with the execution of the cleaning program at operation 204, as well as other data associated with any or all of operations 206-214, may be stored on a data store such as the data store 114 for later analysis or use, including predictive modeling (216—Store data associated with cleaning).

The second triggering event at operation 212 may include a sensor detecting a rise or drop in temperature within a predetermined distance of the target or UV light source, a pressure sensor detecting use of a target and the underlying contact element, a predetermined time associated with a schedule; an activation of a contact element associated with a target; a predetermined time associated with a previous emission of UV light from the UV light source, and combinations thereof. In other examples, the UV light source can remain active in a continuous cleaning event at operation 206 until maintenance of the cleaning system is scheduled or until the environment in which the target is located is closed (e.g., the retail store closes, the aircraft is out of service overnight, etc.), at which point the UV light source is deactivated at operation 214.

The targets and contact elements discussed above can take various forms and combinations of forms and types of removable couplings, as shown and discussed below in FIGS. 3A-3D.

Example Assemblies of Targets and Contact Elements

Figure 3B:
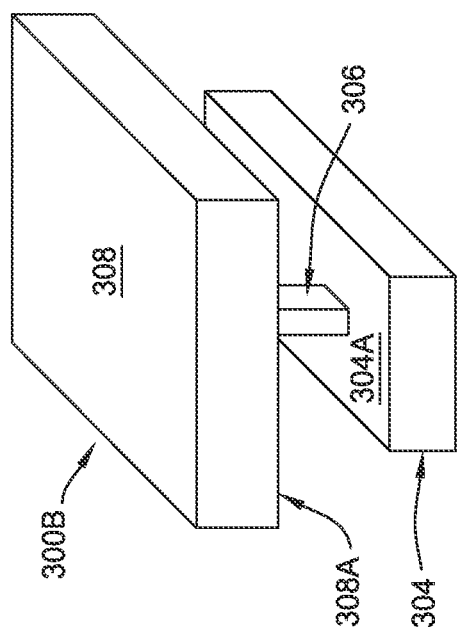
FIGS. 3A-3D depict examples of configurations of cleaning systems according to aspects of the present disclosure.
Figure 3A:
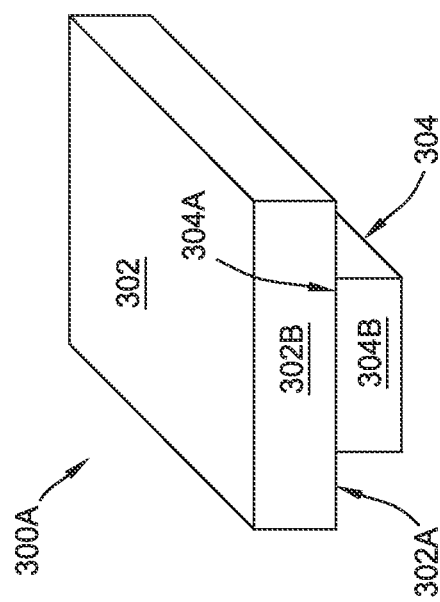

FIGS. 3A-3D depict assemblies of targets and contact elements according to aspects of the present disclosure. FIG. 3A shows a first assembly 300A that includes first target 302 removably coupled to a first contact element 304. The first target 302 is directly in contact with the first contact element 304 such that a first surface 302A of the first target 302 is directly coupled to a first surface 304A of the first contact element 304. The removable coupling of the first target 302 and the first contact element 304 can be via an adhesive (which may be pressure- or thermally-activated), a mechanical coupling such as snaps, clips, hook-and-loop, threads, or pegs, a magnetic coupling, or through combinations of types of couplings. Thus, the first target 302 can be uncoupled from the first contact element 304 and repaired or replaced without damaging the first contact element 304. The first assembly 300A may be used, for example, with contact elements configured for direct contact with the target and in areas without space constraints. An installation environment that does not have space constraints is one which is configured to accept the target (e.g., the first target 302) being coupled, in this example directly coupled, to the contact element (e.g., the first contact element 304) without causing disruption to users' access to the installation environment of the first assembly 300A. The first assembly 300A may be used, for example, in installation environments where the first contact element 304 is a button, door handle, lever, gaming system component, or touch screen (GUI).

In one example, as shown in FIG. 3A, a second surface 304B of the first contact element 304 can be aligned along a common plane with a second surface 302B of the first target 302. In other examples, the first target 302 can be configured and aligned differently with respect to the first contact element 304, where the first target 302 is configured to couple to the first contact element 304 such that a user intending to execute a function via the first contact element 304 (e.g., activate a button, handle, lever, or other contact element to, for example, open a door, open a chute (e.g., trash flap including rollers or wheels), flush a toilet (e.g., flush button), push a button (e.g., soap disperser cap), or execute a banking function) contacts the first target 302 to execute that function and does not contact the first contact element 304. Further, while the first target 302 is illustrated as having a rectangular geometry in FIG. 3A, in other examples, the first target 302 can take other forms such as a triangle, other polygonal form, circle, sphere, conical, or other geometries or combinations of geometries.

FIG. 3B shows a second assembly 300B that includes a second target 308 removably coupled to the first contact element 304. The second assembly 300B depicts the use of a first intermediate element 306. The first intermediate element 306 may be used, for example, in areas where space is limited in order to improve access to users who desire to activate the first contact element 304. In other examples, the first intermediate element 306 may be used in conjunction with the second target 308 to promote cleaning of the second target 308 via a relative position of a UV light source (not pictured). In still other examples, the first intermediate element 306 can be used to promote access to the second target 308 for users with varying degrees of mobility. The first intermediate element 306 can be positioned in direct contact with each of the first contact element 304 and the second target 308. In this example, the first intermediate element 306 is directly and removably coupled to the first surface 304A of the first contact element 304. In another example, the first intermediate element 306 can be slidingly engaged with the first surface 304A of the first contact element 304, configured to roll or slide along the first surface 304A. Further in this example, the first intermediate element 306 can be directly and removably coupled to a first surface 308A of the second target 308. In this example, the application of force to the second target 308 causes the first intermediate element 306 to apply force to the first contact element 304 to cause the first contact element 304 to execute an action as discussed above. The first intermediate element 306 can be formed from a fluorocarbon, ppolytetrafluoroethylene (PTFE), polymers, elastomers, metals, composites, organic materials (e.g., wood), and may or may not include a coating. The first intermediate element 306 can be removably coupled to each of the first contact element 304 and the second target 308 by similar or differing types of couplings, including one or more adhesives (which may be pressure- or thermally-activated), a mechanical coupling such as snaps, clips, hook-and-loop, threads, or pegs, a magnetic coupling, or through combinations of types of couplings. The adhesive(s) discussed herein may be positioned such that the adhesive does not interfere with the use of the UV light sources to clean the target(s).

The second target 308 can be uncoupled from the first intermediate element 306 and repaired or replaced without damaging the second target 308 or the first intermediate element 306. In one aspect, as shown in FIG. 3A, a second surface 304B of the first contact element 304 can be aligned along a common plane with a second surface 308B of the second target 308. In other aspects, the second target 308 can be configured as to be along a different plane with respect to the first contact element 304, where the configuration covers the first contact element 304 such that a user intending to execute a function via the first contact element 304 (e.g., activate a button, handle, lever, or other contact element to, for example, open a door, open a chute, flush a toilet, or execute a banking function) contacts the second target 308 to execute that function and does not directly contact the first contact element 304. Further, while the second target 308 is illustrated as having a rectangular geometry in FIG. 3B, in other examples, the second target 308 can take other forms such as a triangle, other polygonal form, circle, sphere, conical, or other geometries or combinations of geometries.

Figure 3D:
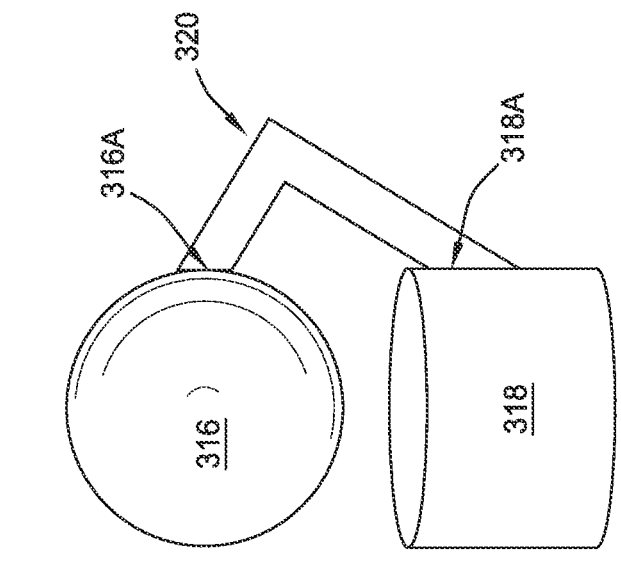
Figure 3C:
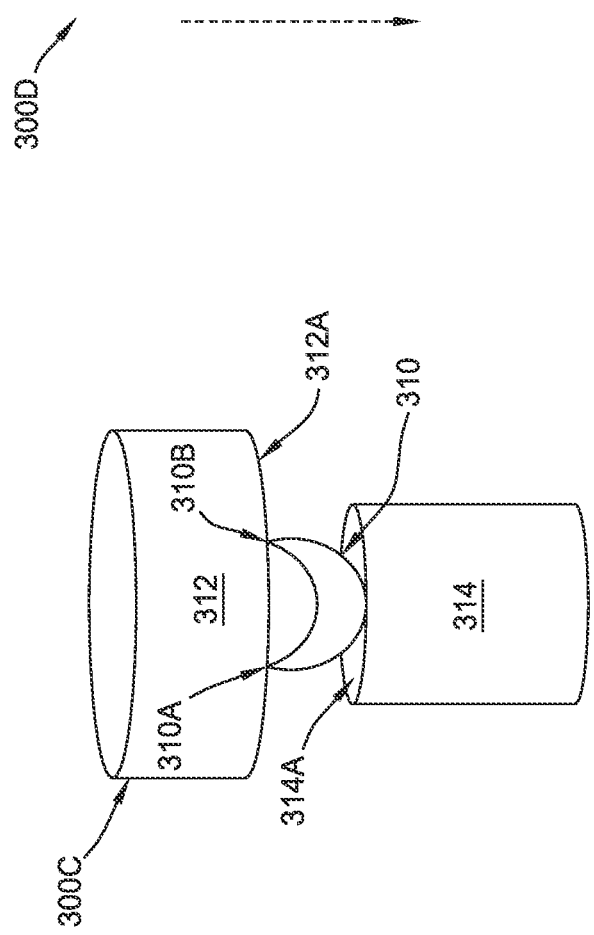

FIG. 3C shows a third assembly 300C that includes a third target 312 removably coupled to a second contact element 314 to illustrate the use of a second intermediate element 310 with varying geometries of the third target 312 and the second contact element 314 as compared to the examples above and below. The second intermediate element 310 may be used, for example, in areas where space is limited in order to improve access to users who desire to activate the second contact element 314. In other examples, the second intermediate element 310 may be used in conjunction with the third target 312 to promote cleaning of the third target 312 via a relative position of a UV light source (not pictured). In still other examples, the second intermediate element 310 can be used to promote access to the third target 312 for users with varying degrees of mobility. The second intermediate element 310 can be positioned in direct contact with each of the second contact element 314 and the third target 312. In this example, the first intermediate element 306 is directly and removably coupled to a first surface 314A of the second contact element 314 and to a first surface 312A of the third target 312, such that applying force to the third target 312 causes the second intermediate element 310 to apply force to the second contact element 314 to cause the second contact element 314 to execute an action as discussed above.

The second intermediate element 310 is shown as having a crescent cross-section in FIG. 3C. The second intermediate element 310 can be in contact with the first surface 312A of the third target 312 via a first contact feature 310A and a second contact feature 310B. In one aspect of the third assembly 300C, a plurality of etched features (not shown here) can be formed on the first surface 312A of the third target 312 in between the first contact feature 310A and the second contact feature 310B and are visible to the user. The second intermediate element 310 can be formed from a fluorocarbon, polymers, elastomers, metals, composites, organic materials (e.g., wood), or combinations thereof, and may or may not include a coating. The first intermediate element 306 can be removably coupled to each of the second contact element 314 and the third target 312 by similar or differing types of couplings, including an adhesive (which may be pressure- or thermally-activated), a mechanical coupling such as snaps, clips, hook-and-loop, threads, or pegs, a magnetic coupling, or through combinations of types of couplings.

The third target 312 can be uncoupled from the first intermediate element 306 and repaired or replaced without damaging the third target 312 or the first intermediate element 306. The configuration of the third target 312 and the second contact element 314 is such that the third target 312 covers the second contact element 314 so that a user intending to execute a function via the second contact element 314 (e.g., activate a button, handle, lever, or other contact element to, for example, open a door, open a chute, flush a toilet, or execute a banking function) contacts the third target 312 to execute that function and does not directly contact the second contact element 314. The third target 312 is illustrated as having a circular disc-like geometry in FIG. 3C. However, in other aspects, the third target 312 can take other forms such as a triangle, other polygonal form, circle, sphere, conical, or other geometries or combinations of geometries.

FIG. 3D shows a fourth assembly 300D that includes a fourth target 316 removably coupled to a third contact element 318 to illustrate the use of a first fixture 320. The first fixture 320 may be used, for example, in areas where space is limited in order to improve access to users who desire to activate the third contact element 318. In other examples, the first fixture 320 may be used in conjunction with the fourth target 316 to promote cleaning of the fourth target 316 via a relative position of a UV light source (not pictured). In still other examples, the first fixture 320 can be used to promote access to the fourth target 316 for users with varying degrees of mobility. The first fixture 320 can be positioned in direct contact with each of the third contact element 318 and the fourth target 316.

In the fourth assembly 300D, the first fixture 320 is directly and removably coupled to a first contact point 318A of the third contact element 318 and to a first contact point 316A of the fourth target 316, such that applying force to the fourth target 316 causes the first fixture 320 to move, which causes the fourth target 316 to apply force directly to the third contact element 318 to cause the third contact element 318 to execute an action as discussed above. In other examples, an intermediate element (not pictured here) can be used in combination with the first fixture 320, such that applying force to the fourth target 316 causes motion of the first fixture 320. The motion of the first fixture 320 applies force to the third contact element 318, thus causing motion of the third contact element 318. As shown herein, force applied to the fourth target 316 in the direction of the arrow can cause motion of the third contact element 318 in a direction perpendicular to the arrow. In other examples, force can be applied to the fourth target 316 in other directions to cause the first fixture 320 to cause the motion of the third contact element 318 in various directions, depending upon factors including the function of the third contact element 318.

The first fixture 320 can be formed from a fluorocarbon, polymers, elastomers, metals, composites, organic materials (e.g., wood), or combinations thereof, and may or may not include a coating. The first fixture 320 can be configured using one or more pivot points, springs, slides, magnetics, or other features or combinations of features to enable movement of the first fixture 320 to ultimately cause the activation of the third contact element 318 when force is applied to the fourth target 316 in one or more directions. The first fixture 320 can be removably coupled to each of the third contact element 318 and the fourth target 316 by similar or differing types of couplings, such as an adhesive (which may be pressure- or thermally-activated), a mechanical coupling such as snaps, clips, hook-and-loop, threads, or pegs, a magnetic coupling, or through combinations of types of couplings.

The fourth target 316 can be uncoupled from the first fixture 320 and repaired or replaced without damaging the fourth target 316 or the first fixture 320. The configuration of the fourth target 316 and the third contact element 318 is such that the fourth target 316 covers the third contact element 318 is such that a user intending to execute a function via the third contact element 318 (e.g., activate a button, handle, lever, or other contact element to, for example, open a door, open a chute, flush a toilet, or execute a banking function) contacts the fourth target 316 to execute that function and does not directly contact the third contact element 318. Further, while the fourth target 316 is illustrated as having a spherical geometry in FIG. 3D, in other examples, the fourth target 316 can take other forms such as a triangle, other polygonal form, circle, sphere, conical, or other geometries or combinations of geometries.

Example Configurations of UV Light Sources and Targets

Figure 4A:
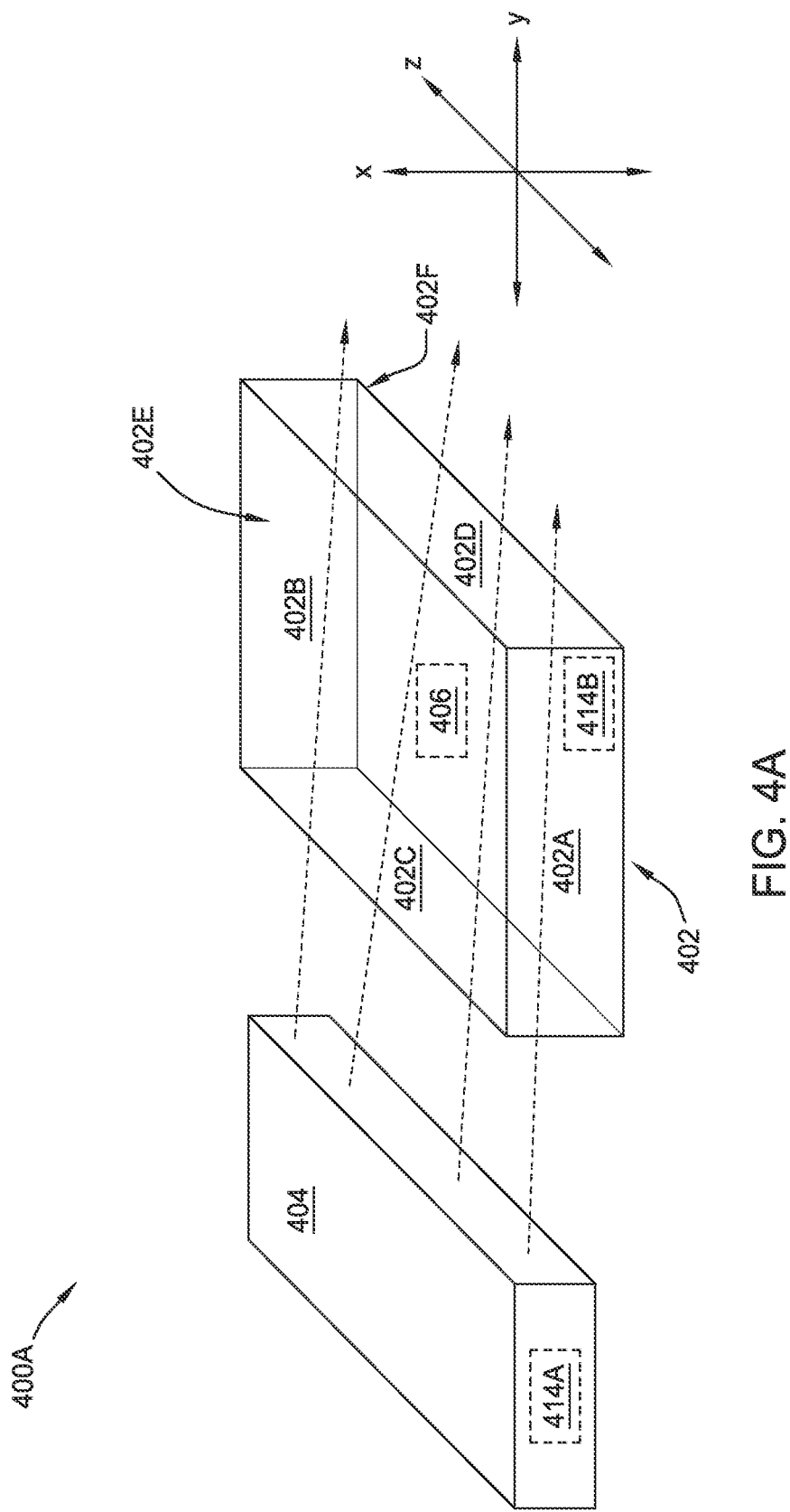

FIG. 4A-4F depict various configurations of targets and UV light sources of cleaning systems according to aspects of the present disclosure. FIG. 4A depicts a first configuration 400A of a UV light source 404 and a target 402. The UV light source 404 can optionally include a first sensor 414A which may be similar to the sensor(s) 110 discussed above in FIG. 1. The target 402 includes a first surface 402A opposite a second surface 402B, a third surface 402C opposite a fourth surface 402D, and a fifth surface 402E opposite a sixth surface 402F. While the target 402 and the UV light source 404 shown in FIGS. 4A-4F are shown as having a rectangular shape. However, in other aspects of cleaning systems discussed herein, one or both of the target 402 and the UV light source 404 may be formed in other geometries or combinations of geometries such as other polygons, triangles, circles, domes, spheres, ellipses, or crescents, such that the UV light source 404 is configured to emit UV light towards one or more surfaces of the target 402.

In some examples, the target 402 includes a second sensor 414B instead of or in addition to the first sensor 414A that is associated with the UV light source 404. The target 402 can further include an indicator 406 that may be etched in or coupled to the sixth surface 402F. The indicator 406 can include text, graphics, or a combination of text and graphics that indicate the target 402 is UV-cleaned. In some examples, the indicator 406 can further include a brand identity associated with the manufacturer of the target 402, the owner of the environment in which the target 402 is positioned, or other brands as appropriate.

In the example in FIG. 4A, the UV light source 404 is positioned along a shared plane with the target 402, such that the UV light emitted from the UV light source 404 is directed through the third surface 402C, through the target 402 along the y-direction, such that each of the surfaces (402A-402F) can be cleaned using the UV light source 404. In other examples discussed herein, the UV light source 404 and/or the target 402 may be positioned such that less than all of the surfaces of the target 402 are cleaned by the UV light source. In still other examples discussed herein, the UV light source 404 and/or the target 402 may be positioned such that more than one surface but less than all of the surfaces of the target 402 are directly cleaned by the UV light source. In those examples, the two or more surfaces of the target 402 may be cleaned with UV light using one or more additional elements to direct the UV light from the UV light source 404 towards or through various surfaces of the target 402.

Figure 4B:
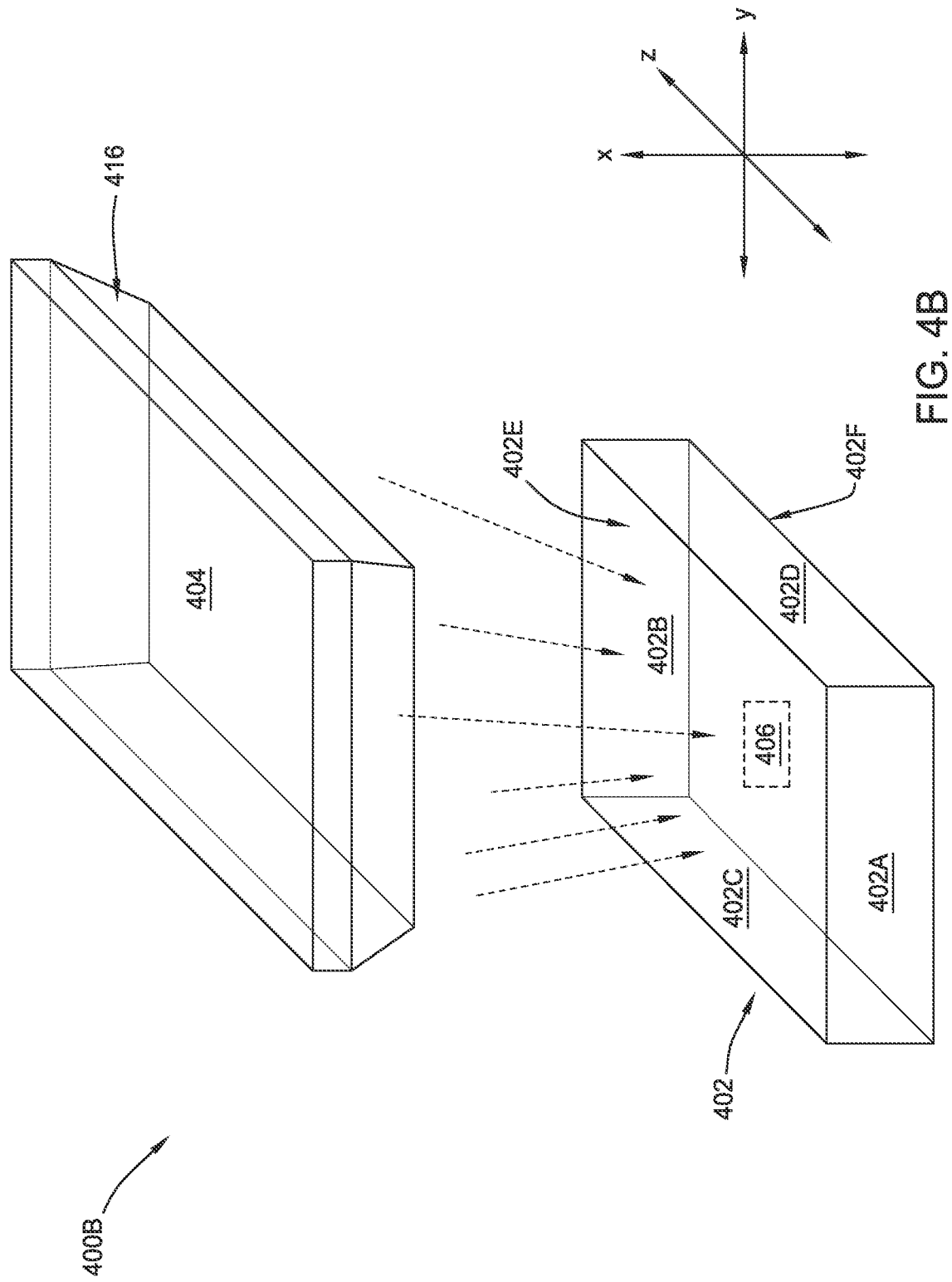

FIG. 4B depicts a second configuration 400B of a UV light source 404 and a target 402. The target 402 includes a first surface 402A opposite a second surface 402B, a third surface 402C opposite a fourth surface 402D, and a fifth surface 402E opposite a sixth surface 402F. The target 402 can further include an indicator 406 that may be etched in or coupled to the sixth surface 402F. The indicator 406 can include text, graphics, or a combination of text and graphics that indicate the target 402 is UV-cleaned. In some examples, the indicator 406 can further include a brand identity associated with the manufacturer of the target 402, the owner of the installation environment in which the target 402 is positioned, or other brands or indications as appropriate.

The UV light source 404 further includes a UV light source reflector 416 positioned around a perimeter of the UV light source 404. In the example in FIG. 4B, the UV light source 404 is positioned along a shared plane with the target 402, such that the UV light emitted from the UV light source 404 is directed through the fifth surface 402E, through the target 402 along the x-direction. The UV light source reflector 416 can be formed from porous materials as discussed herein that are configured to direct light towards the fifth surface 402E of the target 402, such that the UV light emitted from the UV light source 404 cleans the fifth surface 402E which may then be contacted by users. In one aspect, the UV light source reflector 416 can be formed from a fluoropolymer. In another aspect, the UV light source reflector 416 can be formed from a material including a plurality of pores, wherein each pore of the plurality of pores has a maximum diameter less than the minimum wavelength emitted by the UV light source 404.

In this example, the sixth surface 402F can also be cleaned via the UV light source 404, but other surfaces may not be cleaned. The configuration of various UV light sources and targets discussed herein may be selected to clean various surfaces of the target that a user would touch, while not cleaning surfaces that a user would not touch. Surfaces that a user would not touch include those flush with a wall or other surface, or surfaces coupled to the contact element, or other surfaces depending upon the configuration. While not shown in FIG. 4B, one or more sensors may be present and coupled to either the UV light source 404, the target 402, or may be positioned remotely in an environment in which the second configuration 400B is installed.

In each of the examples in FIGS. 4A and 4B, the UV light source 404 is not directly coupled to the target 402. Rather, the UV light source 404 can be described as being remotely positioned with respect to the target 402. In some aspects, the UV light source 404 can be configured to emit UV light to clean one or more surfaces of the target 402 in response to a triggering event detected by a sensor (414A, 414B) or in response to a manual command. The remote position of a UV light source 404 with respect to a target 402 can result in varying distances from the UV light source 404 and the target 402. These distances can vary from a few inches to several feet, depending upon the type of contact element, the type of UV light source 404, the geometry of the target 402 or the contact element, the type of installation environment, or other factors or combinations of factors.

Figure 4C:
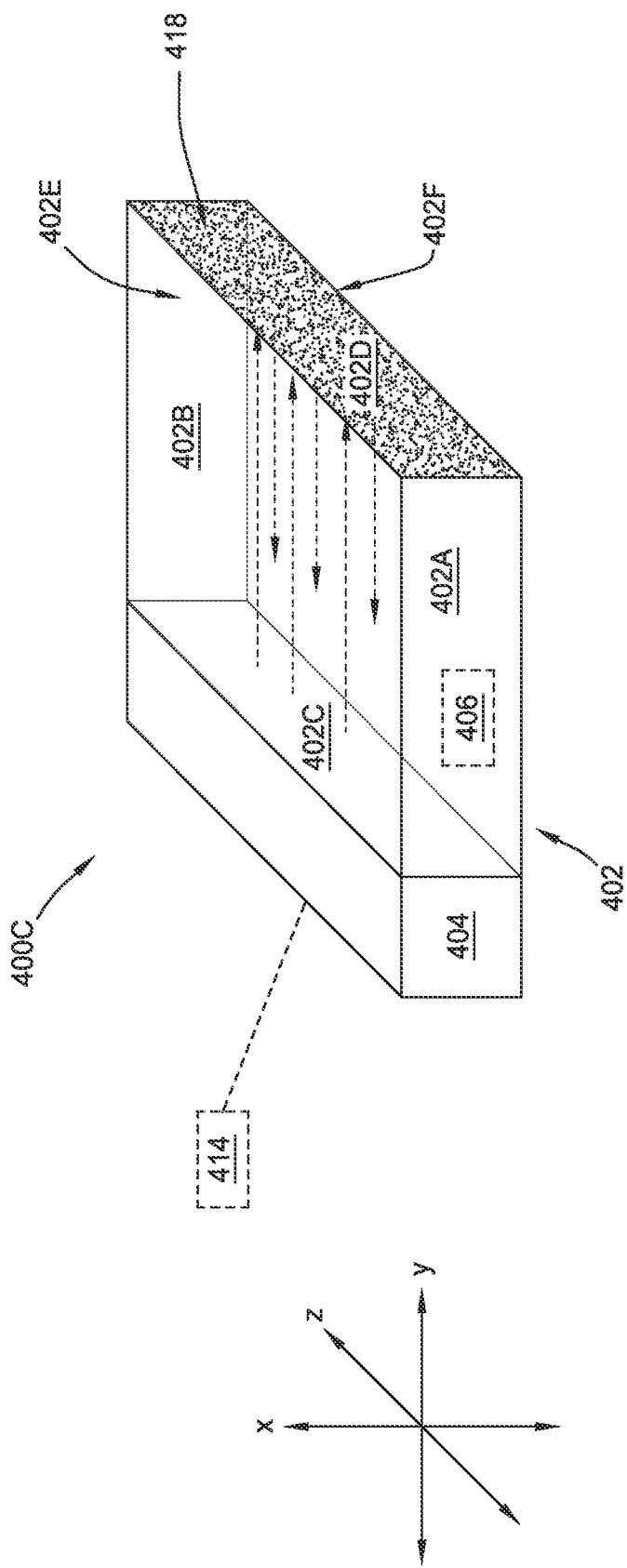

FIG. 4C depicts a third configuration 400C of a UV light source 404 and a target 402. The target 402 as well as the indicator 406 are similar to those described above in FIGS. 4A and 4B. The UV light source 404 is removably coupled to the target 402 at the third surface 402C. The third configuration 400C, having the UV light source 404 removably coupled to the target 402, may be used when the environment in which the cleaning system is installed is configured to enable the configuration, for example, when the UV light source 404 is configured to be on continuously, as opposed to being turned on for discreet time periods in between individual uses and/or at predetermined time periods or in response to other triggers.

Figure 4D:
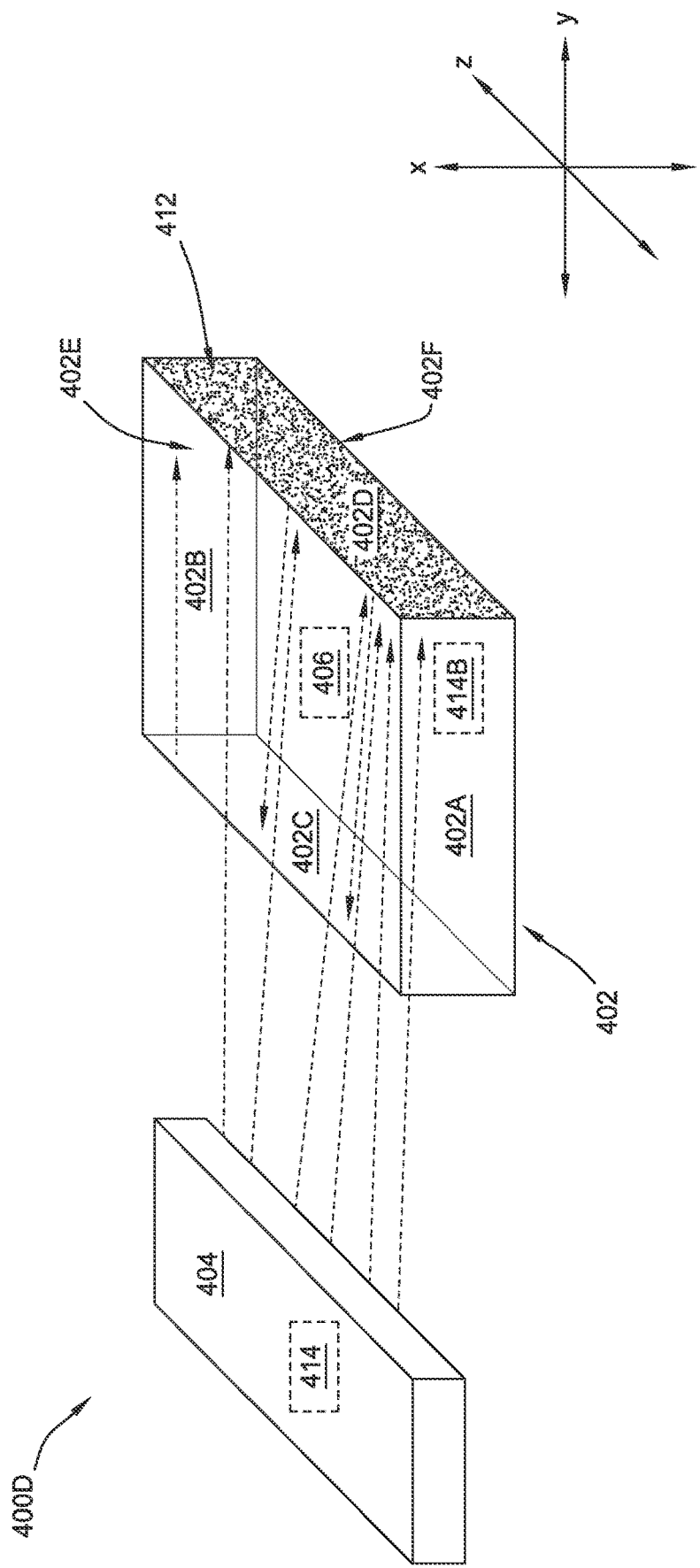

Depending upon the example, the target reflector 418 can be removably or permanently coupled to or formed integrally with the fourth surface 402D of the target 402. In one example, the target reflector 418 can be formed from a fluoropolymer. In another example, the target reflector 418 can be formed from a material including a plurality of pores, wherein each pore of the plurality of pores has a maximum diameter less than the minimum wavelength emitted by the UV light source 404. The UV light emitted from the UV light source 404 can be emitted along the x-axis, and is reflected by the target reflector 418. Depending upon the example, the target reflector 418 may be have a smooth surface opposite the UV light source 404 or a textured surface opposite the UV light source 404. When the target reflector 418 includes a textured surface, it may reflect the UV light emitted through the third surface 402C and/or the fifth surface 402E through one or more surfaces (402A, 402B, 402F). In another example, the target reflector 418 can be positioned along the z-axis, as shown in FIG. 4D. In still other examples, which can be combined with other examples herein, the target reflector 418 can be curved or bowed along the z-axis, x-axis, or y-axis, or combinations thereof, and used to direct UV light emitted through the third surface 402C and/or the fifth surface 402E through one or more surfaces (402A, 402B, 402F). As discussed above, one or more sensors (414A, 414B) may be present and coupled to either the UV light source 404, the target 402, or may be positioned remotely in an environment in which the configuration 400B is installed and configured to cause the activation and/or deactivation of the UV light source 404

The surfaces (402A-402F) of the target 402 can be configured as smooth surfaces, where "smooth" surfaces allow UV light to pass through the surface but do not reflect the UV light that is directed towards the surface. In other examples, one or more surfaces (402A-402F) can be configured with various patterns that can be chemically etched, mechanically machined, or otherwise form. These etchings may be part of the indicator 406 (discussed above) to indicate the method of cleaning used to clean the target and/or a brand as discussed above. In other examples, which can be combined with examples herein, the one or more surfaces (402A-402F) of the target 402 can be etched or otherwise patterned to addition to direct the UV light towards other surfaces of the target 402 to clean those surfaces. This is discussed in detail below in FIGS. 7A-7E.

FIG. 4D depicts a fourth configuration 400D of a UV light source 404 and a target 402. The fourth configuration 400D is similar to the first configuration 400A in FIG. 4A, having a UV light source 404 that is remotely positioned (e.g., not coupled to) the target 402. Depending upon the example, a target reflector 412 can be removably or permanently coupled to or formed integrally with the fourth surface 402D of the target 402. The target reflector 412 can be configured to couple to the fourth surface 402D or other surfaces of the target regardless of whether the surface is flat, curved, wavy, or otherwise configured. In one example, the target reflector 412 can be formed from a fluoropolymer. In another example, the target reflector 412 can be formed from a material including a plurality of pores, wherein each pore of the plurality of pores has a maximum diameter less than the minimum wavelength emitted by the UV light source 404. The UV light emitted from the UV light source 404 can be emitted along the x-axis, and is reflected by the target reflector 412. Depending upon the example, the target reflector 412 may be have a smooth surface or a textured surface. When the target reflector 412 includes a textured surface, it may reflect the UV light emitted through the third surface 402C and/or the fifth surface 402E through one or more surfaces (402A, 402B, 402F). In another example, the target reflector 412 can be positioned along the z-axis, as shown in FIG. 4D. In still other examples, which can be combined with other examples herein, the target reflector 412 can be curved or bowed along the z-axis, x-axis, or y-axis, or combinations thereof, and used to direct UV light emitted through the third surface 402C and/or the fifth surface 402E through one or more surfaces (402A, 402B, 402F). As discussed above, one or more sensors 414A, 414B may be present and coupled to either the UV light source 404, the target 402, or may be positioned remotely in an environment in which the second configuration 400B is installed and configured to cause the activation and/or deactivation of the UV light source 404.

FIG. 4E depicts a fifth configuration 400E of a UV light source 404 and a target 402. The fifth configuration 400E is similar to the third configuration 400C in FIG. 4C. The UV light source 404 is removably coupled to the target 402 at the third surface 402C. In contrast to FIG. 4C, the target 402 includes a target absorber 420 configured to absorb the UV light emitted from the UV light source 404. Depending upon the example, the target absorber 420 can be removably or permanently coupled to or formed integrally with the fourth surface 402D of the target 402. In one aspect, the target absorber 420 can be formed from a fluoropolymer. In another example, the target absorber 420 can be formed from a material including a plurality of pores, wherein each pore of the plurality of pores has a maximum diameter greater than the maximum wavelength emitted by the UV light source 404. As discussed above, one or more sensors (414A, 414B) may be present and coupled to either the UV light source 404, the target 402, or may be positioned remotely in an environment in which the second configuration 400B is installed and configured to cause the activation and/or deactivation of the UV light source 404. The fifth configuration 400E may be used, for example, when the contact element (not shown) that is removably coupled to the target 402 is activated by a user touching one or more of the target 402 surfaces 402A, 402B, 402E, or 402F. In this example, the third surface 402C may not be cleaned.

Figure 4F:
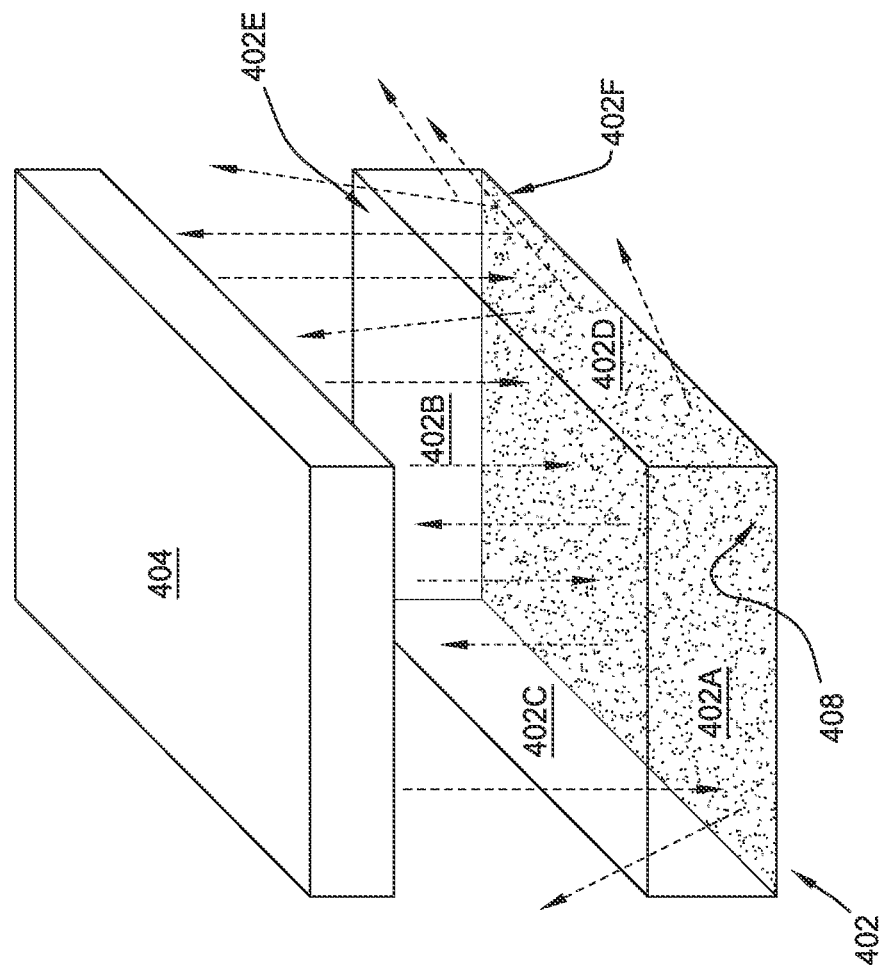
Figure 4F:
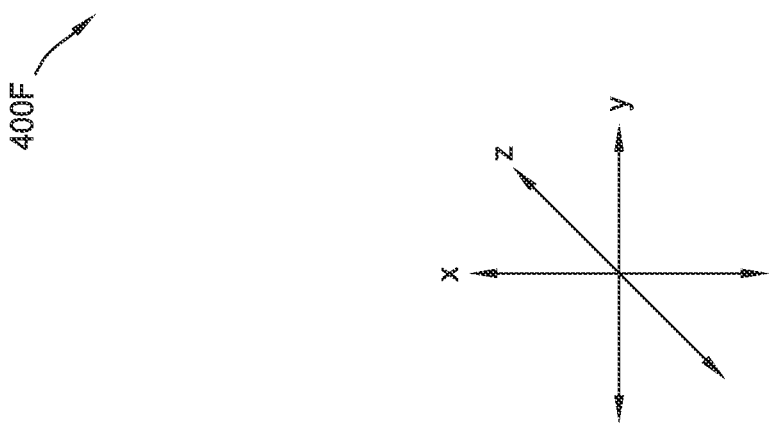

FIG. 4F depicts a sixth configuration 400F of a UV light source 404 and a target 402, and may be similar to the third configuration 400C in FIG. 4C but differ in that the UV light source 404 is positioned remotely with respect to the target 402 at the fifth surface 402E. The UV light source 404 is thus configured to emit UV light through the fifth surface 402E. The target 402 in this configuration can include a light directing element 408. As used herein, a "light directing element" 408 is used to mean a component that is used to direct UV light either towards it or aware from it. Accordingly, a light directing element 408 can be a reflector or an absorber, depending upon the example. The light directing element 408 can be removably or permanently coupled to or formed integrally with the fifth surface 402E of the target 402. In one example, the light directing element 408 can be formed from a fluoropolymer. In another example, the light directing element 408 and may be a reflector formed from a material including a plurality of pores, wherein each pore of the plurality of pores has a maximum diameter less than the minimum wavelength emitted by the UV light source 404. The UV light emitted from the UV light source 404 can be emitted along the y-axis, and is reflected by the light directing element 408 through one or more of the target surfaces (402A, 402B, 402C, 402D when the light directing element 408 has a textured surface configured to receive and reflect the UV light. This reflection can also occur if the light directing element 408 is curved or bowed along the z-axis, x-axis, or y-axis, or combinations thereof. In some examples, the light directing element 408 can include a textured surface and may also be bowed or curved in along one or more directions. The sixth configuration 400F may be used, for example, when a user is likely to contact the surfaces 402E, 402C, 402D, 402A, or 402B in various combinations while using a contact element (not pictured) removably coupled to the target 402. For example, the sixth configuration 400F may be used when the contact element is a handle or lever, or otherwise, for example, if the sixth surface 402F is slidingly engaged with another surface and may not be contacted by a user.

Figure 5:
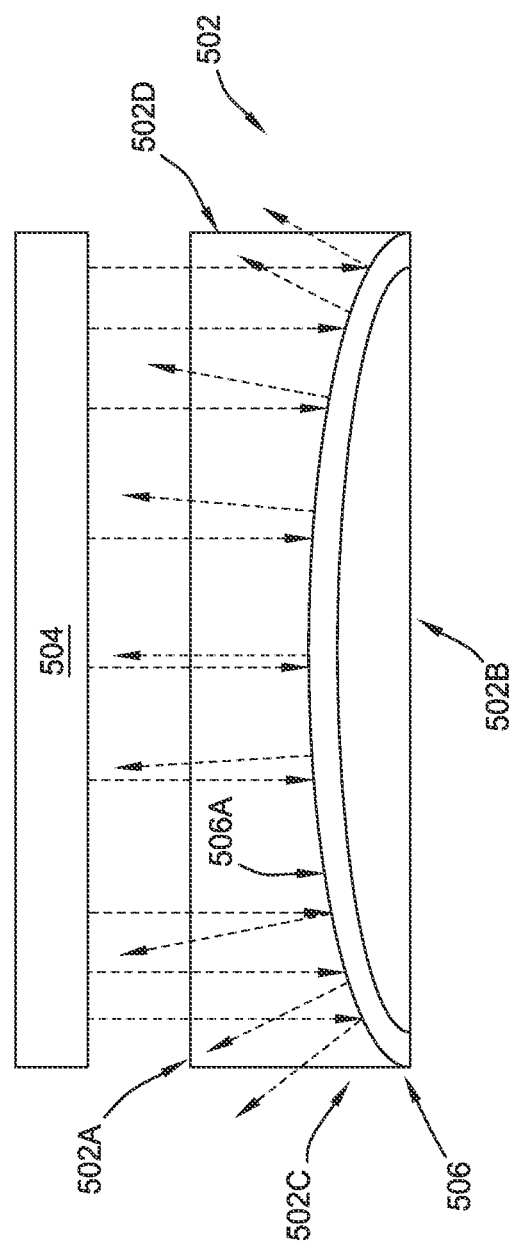
FIG. 5 depicts a cross-sectional view of a cleaning system that includes a UV light source arranged remotely with respect to a target system according to aspects of the present disclosure.

FIG. 5 depicts a cross-sectional view of a cleaning system 500 that includes a UV light source 504 arranged remotely with respect to a target 502 system according to aspects of the present disclosure. The UV light source 504 is configured to emit UV light towards a first surface 502A of the target 502. The target 502 is shown to have a rectangular cross-section in FIG. 5. In other examples, the target 502 can have cross-sectional geometries of other polygonal shapes, or be triangular, circular, elliptical, crescent-shaped, or other geometries or combinations of geometries. In this example, the first surface 502A is positioned parallel to and across from a second surface 502B. A distance between the target 502 and the UV light source 504 may vary. In one example, the distance between the target 502 and the UV light source 504 can be from about 3" to about 24," in another example, the distance between the target 502 and the UV light source 504 can be from about 6" to about 18," in yet another example, the distance between the target 502 and the UV light source 504 can be from about 9" to about 12". A third surface 502C of the target 502 is positioned parallel to and across from a fourth surface 502D. The target 502 includes a reflector 506 positioned in between the first surface 502A and the second surface 502B. The reflector 506 is shown to have a curved form in this cross-sectional view, such that the UV light emitted from the UV light source 504 towards the first surface 502A is emitted through the first surface 502A and reflected back towards that surface as well as towards the third surface 502C and the fourth surface 502D, thus cleaning at least the first surface 502A, the third surface 502C, and the fourth surface 502D. The reflector 506 is shown as being bowed in a direction towards the x-axis. In other examples, the reflector 506 can be bowed or otherwise curved along the z-axis, y-axis, or other combinations of axes. The UV-target surface 506A of the reflector 506 can be smooth. In other examples, the UV-target surface 506A of the reflector 506 can be texturized to include various features designed to direct the UV light in a variety of directions towards various surfaces of the target 502.

Depending upon the curvature and/or texture of the reflector 506, the UV light may be reflected through additional surfaces of the target 502 not shown in this view. Depending upon the example, the target 502 can be configured such that it is disassembled during maintenance or refurbishment and the reflector 506 is re-used, or the target 502 can be configured such that the entire assembly of the target 502 and the reflector 506 is replaced. In other examples, the UV light source 504 may be located in other positions relative to the target 502 to clean various surfaces of the target 502.

Example Cleaning System Configurations

Figure 6A:
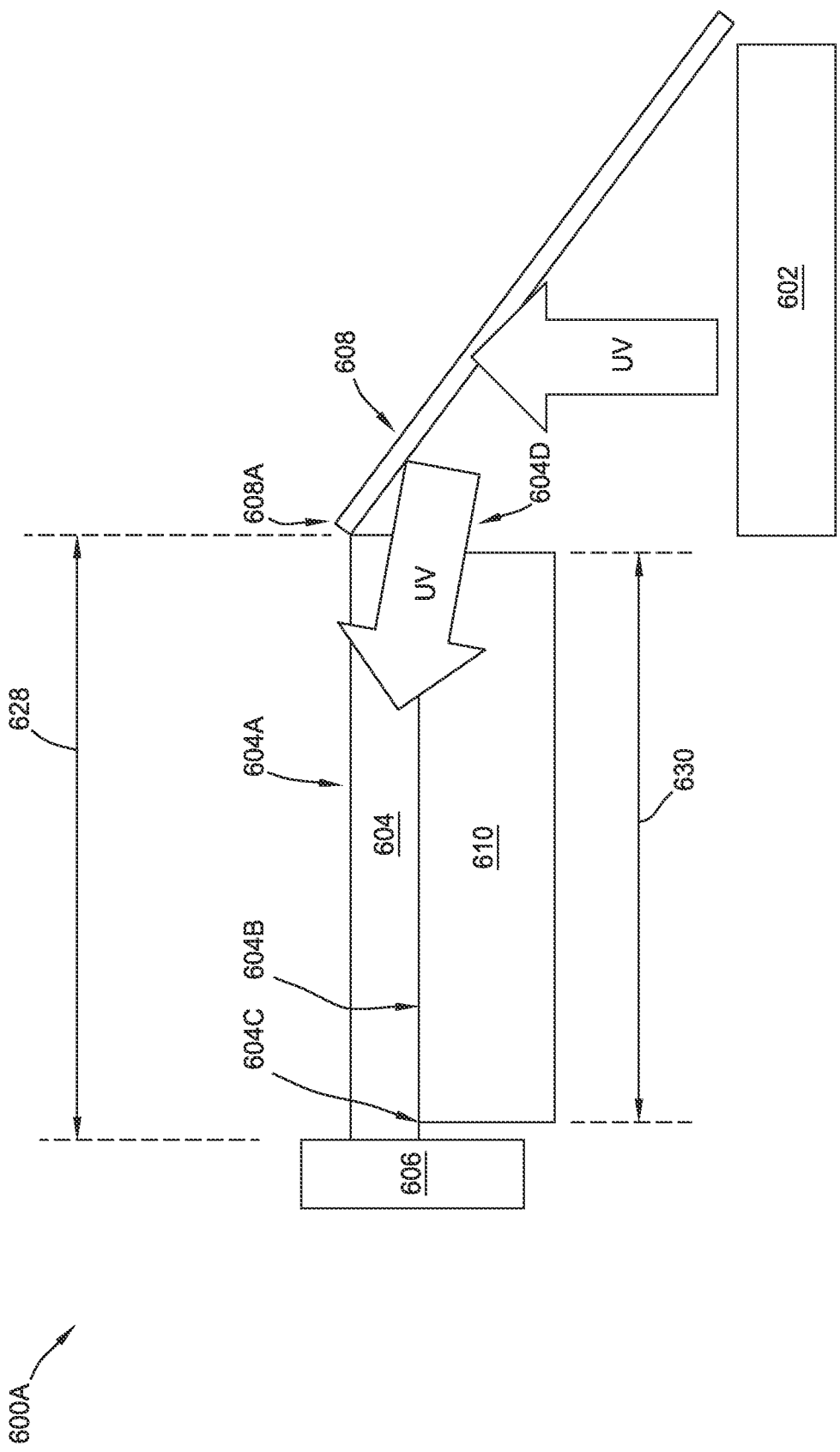
FIG. 6A-6C depict examples of cleaning systems according to aspects of the present disclosure.
Figure 6B:
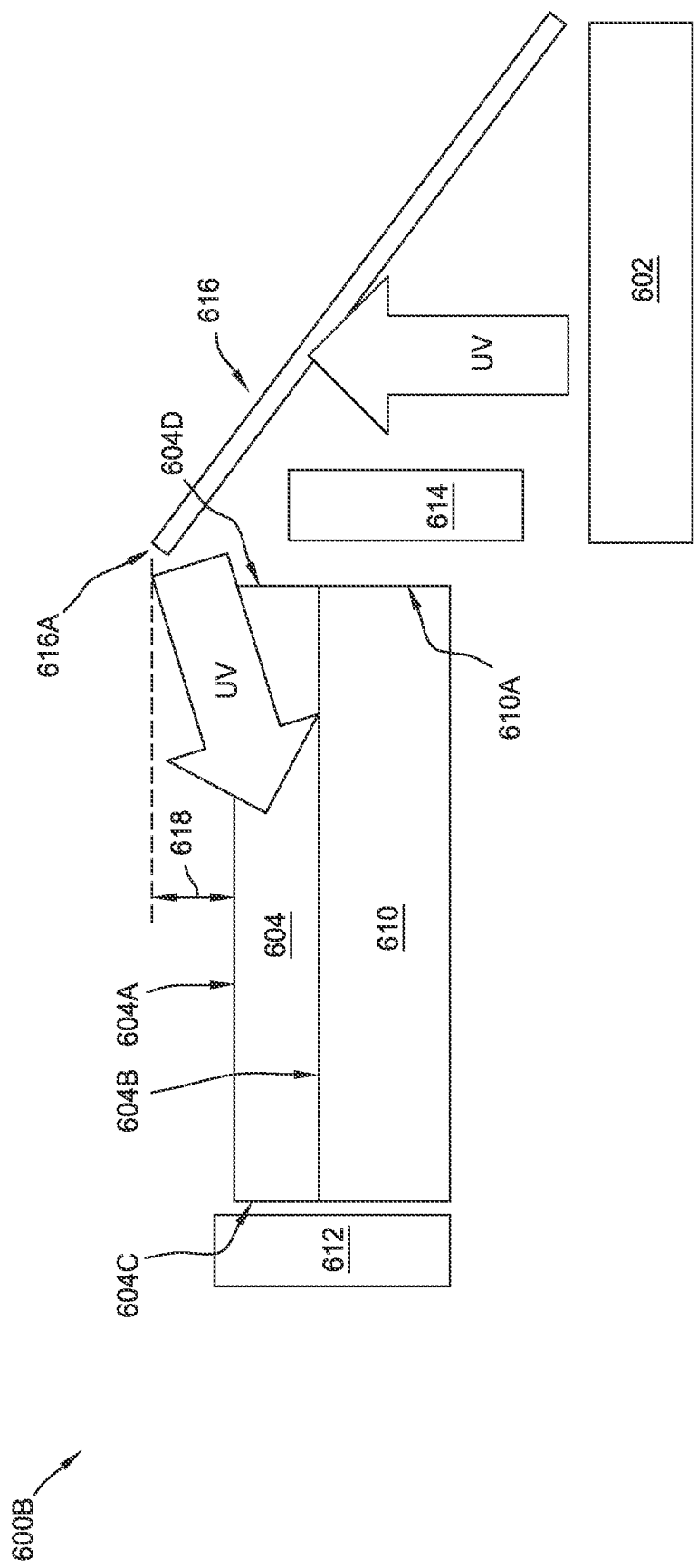
Figure 6C:
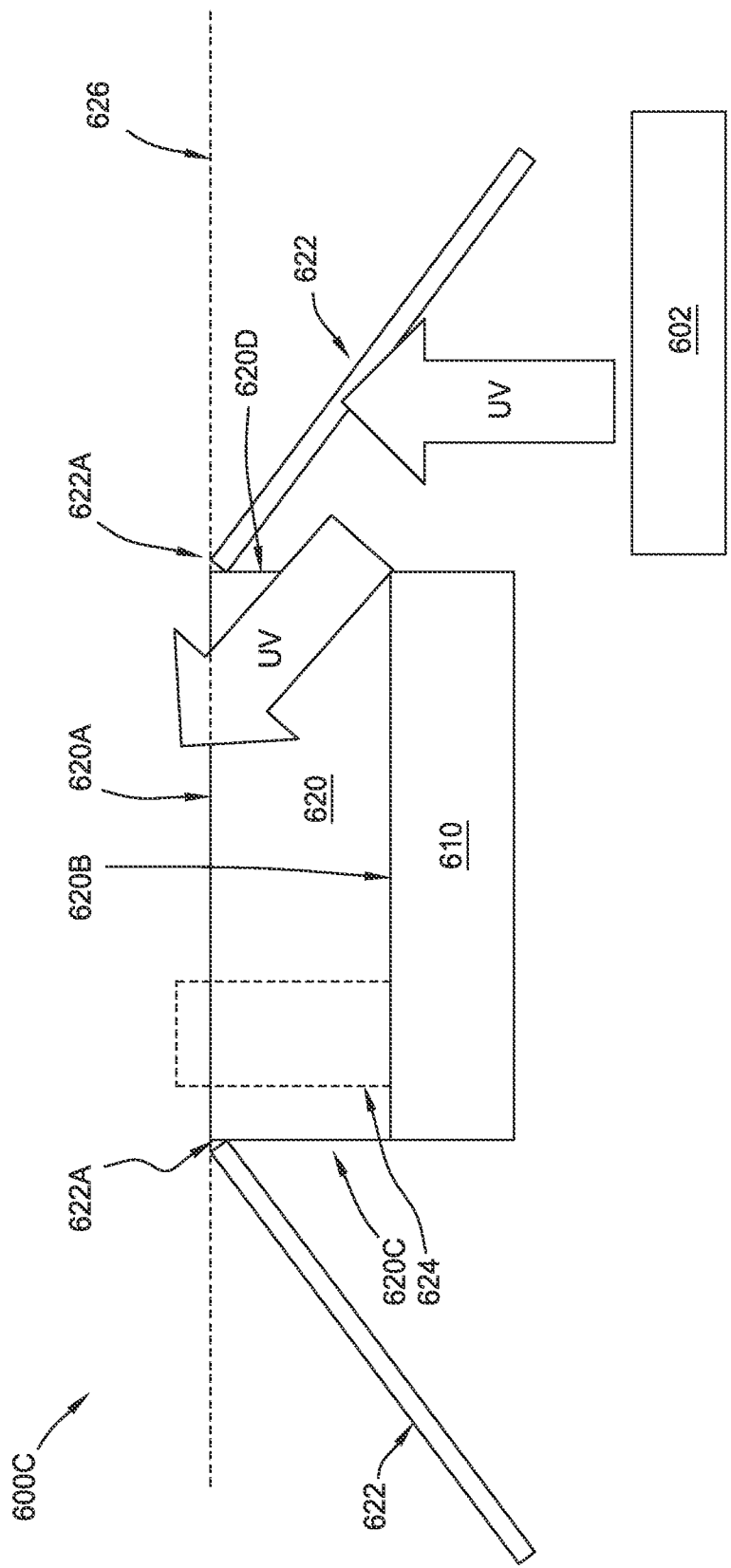

FIG. 6A-6C depict examples of cleaning systems according to aspects of the present disclosure. FIG. 6A illustrates a side view of a first cleaning system 600A that includes a UV light source 602, a reflector 608, a target 604, and an absorber 606. The target 604 is shown here as having a geometry of a rectangle, such that a first surface 604A is parallel to and opposite a second surface 604B, and a third surface 604C is parallel to and opposite from a fourth surface 604D. The third surface 604C and the fourth surface 604D being perpendicular to each of the first surface 604A and the second surface 604B.

The reflector 608 is positioned to direct the UV light emitted by the UV light source 602 towards the first surface 604A of the target 604 through the fourth surface 604D, cleaning at least the first surface 604A and the fourth surface 604D. In examples where the distance between the third surface 604C and the fourth surface 604D is a width 628 of the target 604 and is greater than a width 630 of the contact element 610, the UV light can also be reflected up through the second surface 604B of the target 604, further cleaning the second surface 604B. A top end 608A of the reflector 608 is positioned to be substantially co-planar with the first surface 604A of the target to clean the first surface 604A with the UV light emitted and reflected from the UV light source 602. The target 604 is removably coupled to a contact element 610 via the second surface 604B of the target 604. The contact element 610 may represent any of the contact elements discussed herein, such as handles, levers, buttons, touch screens, counters, or other types or combinations of types of contact elements.

The absorber 606 is positioned adjacent to the third surface 604C of the target 604. In some examples, the absorber 606 may be removably coupled to the target using an adhesive (which may be pressure- or thermally-activated), a mechanical coupling such as snaps, clips, hook-and-loop, threads, or pegs, a magnetic coupling, or through combinations of types of couplings. The absorber 606 is configured to absorb the UV light emitted from the UV light source 602. The thickness of the target 604, as measured perpendicular to the first surface 604A, can be from about 0.2 millimeters (mm) to about 20 centimeters (cm). In another example, the thickness of the target 604, as measured perpendicular to the first surface 604A, can be from about 0.2 mm to about 2 mm. In yet another example, the thickness of the target 604, as measured perpendicular to the first surface 604A, can be from about 1 mm to about 10 cm.

The configuration shown in FIG. 6A can be used, for example, when the contact element 610 is a counter or other surface such that users would be located on the same side of the system 600A as the third surface 604C and the absorber 606, the absorber 606 being used to shield the users from the reflected and emitted UV light. The first cleaning system 600A can be used when the UV light source 602 is configured for continuous UV light emission.

FIG. 6B illustrates a side view of a second cleaning system 600B includes a UV light source 602, a reflector 608, a target 604, a light directing element 612, and an absorber 614. The target 604 is shown here as having a side-view (cross-section) geometry of a rectangle, such that a first surface 604A is parallel to and opposite a second surface 604B, and a third surface 604C is parallel to and opposite from a fourth surface 604D. The third surface 604C and the fourth surface 604D being perpendicular to each of the first surface 604A and the second surface 604B.

The reflector 616 is positioned to direct the UV light emitted by the UV light source 602 towards the first surface 604A of the target 604. A top end 616A of the reflector 616 is positioned to be above the first surface 604A of the target 604 by a distance 618, as measured from the first surface 604A to the top end 616A of the reflector 616. In one example, the distance 618 can be from about 0.20 inches (in.) to about 4.00 in. In another example, the distance 618 can be from about 0.50 in. to about 2.50 in. In yet another example, the distance 618 can be from about 0.75 in. to about 1.50 in. The position of the top end 616A of the reflector 616 relative to the first surface 604A of the target 604 enables the UV light to hit the first surface 604A at an angle perpendicular to the first surface 604A, this is in contrast to the more shallow contact angle provided by the co-planar reflector 608 in the first cleaning system 600A.

The first surface 604A is cleaned with the UV light emitted and reflected from the UV light source 602. The target 604 is removably coupled to a contact element 610 via the second surface 604B of the target 604. The contact element 610 may represent any of the contact elements discussed herein, such as handles, levers, buttons, touch screens, counters, or other types or combinations of types of contact elements.

In further contrast to the first cleaning system 600A, the second cleaning system 600B includes the absorber 614 positioned parallel to the fourth surface 604D of the target 604. As shown in FIG. 6B, the absorber 614 can be offset from the fourth surface 604D of the target to allow some of the UV light emitted from the UV light source 602 to be reflected through the fourth surface 604D while shielding at least a surface 610A of the contact element 610, from the UV light. In one aspect, the absorber 614 may be used to prevent UV light from being emitted through the target 602 up through the first surface 604A to shield users from the UV light. In another example, the absorber 614 may be further used to prevent UV light from entering the target 604 through the second surface 604B of the target 604, for example, if the target 604 extends beyond the contact element 610 (e.g., if the target 604 and contact element 610 have differing geometries along the surfaces where each is removably coupled to the other). This configuration may be used, for example, when the contact element 610 is formed from a material that may be sensitive to direct UV light exposure, or when there may be users located in a position where the UV light would otherwise contact those users.

The second cleaning system 600B may further include the light directing element 612 positioned adjacent to the third surface 604C of the target 604. In some examples, the light directing element 612 may be removably coupled to the target using an adhesive (which may be pressure- or thermally-activated), a mechanical coupling such as snaps, clips, hook-and-loop, threads, or pegs, a magnetic coupling, or through combinations of types of couplings. In one aspect, the light directing element 612 is configured to absorb the UV light emitted from the UV light source 602. In another aspect, the light directing element 612 is configured to reflect the UV light emitted from the UV light source 602 back into the target 604 to clean or re-clean various surfaces of the target 604. The light directing element 612 can be fabricated from various materials as discussed above, depending upon if it is used as an absorber or a reflector. The configuration shown in FIG. 6B can be used, for example, to control the direction of UV light and may be used to clean touch screens. The touch screens included at the contact element 610 in this example can be disposed in aircraft passenger cabins or cockpits, disposed in other transportation vehicles, used in gaming systems, or in kiosks including retail kiosks and those located in and associated with financial institutions. The second cleaning system 600B may, as discussed with other examples herein, be used for continuous illumination.

FIG. 6C illustrates a side view of a third cleaning system 600C that includes a UV light source 602, a reflector 622, and a target 620. The target 620 is shown here as having a side-view (cross-section) geometry of a rectangle, such that a first surface 620A is parallel to and opposite a second surface 620B, and a third surface 620C is parallel to and opposite from a fourth surface 620D. The third surface 620C and the fourth surface 620D are perpendicular to each of the first surface 620A and the second surface 620B in FIG. 6C. In other examples, the target may have a different cross-sectional geometry of another polygon, a triangle, a circle, a semi-circle, a crescent, or other geometry or combinations of geometries. The target 620 is removably coupled to a contact element 610 via the second surface 620B of the target 620. The contact element 610 may represent any of the contact elements discussed herein, such as handles, levers, buttons, touch screens, counters, or other types or combinations of types of contact elements.

The reflector 622, in contrast to other examples herein, is positioned around two or more outer surfaces (e.g., 620C, 620D) to direct the UV light emitted by the UV light source 602 towards the first surface 620A of the target 620 and to contain the emitted UV light. In other examples, the reflector 622 can be positioned around the perimeter of the target 620. The reflector 622 can be removably or permanently coupled to the target 620 via an adhesive, a mechanical coupling, a magnetic coupling, a press-fit coupling, or combinations thereof. A top edge 622A of the reflector 622 is substantially co-planar with the first surface 620A of the target. The configuration of the third cleaning system 600C enables its installation such that, in addition to the top edge 622A of the reflector 622 being flush with the first surface 620A of the target 620, both the top edge 622A of the reflector 622 and the first surface 620A of the target 620 are co-planar with a surface 626 of the installation environment. As discussed above, the installation environment may be an aircraft, plane, train, boat, car, retail location, restaurant, or other environment having a tabletop, a seat back, a kiosk, a wall, or other surfaces 626.

The thickness of the target 604, as measured perpendicular to the first surface 604A, can be from about 1 cm to about 20 cm. In another example, the thickness of the target 620, as measured perpendicular to the first surface 620A, can be from about 5 cm to about 15 cm. In yet another example, the thickness of the target 620, as measured perpendicular to the first surface 620A, can be from about 10 mm to about 20 cm.

The configuration of the third cleaning system 600C shown in FIG. 6C can be used, for example, for intermittent UV cleaning, in contrast to continuous illumination. The thickness of the target 620 may be greater than that of the targets shown in other examples, which, in combination with the absence of absorbers, enables more light to be reflected up through the target towards the first surface 620A, as shown by the arrows. A portion 624 of the target 620 is shown in FIG. 6C for use in FIGS. 7A-7E, discussed below.

Examples of Textures Used to Direct UV Light

FIGS. 7A-7E depict examples of texturized targets according to aspects of the present disclosure. Each of FIGS. 7A-7E illustrates the portion 624 from FIG. 6C, and shows various options for the texture of the second surface 620B (identified as 702, 706, 710, and 714, respectively, in FIGS. 7A-7E) of the target 620 when the second surface 620B is not a smooth surface. In some examples, the textured surfaces discussed herein may extend over the entirety of the second surface 620B. In other examples, the textured surfaces discussed herein may extend over a portion of the second surface 620B that is less than the entirety of the second surface 620B.

Figure 7B:
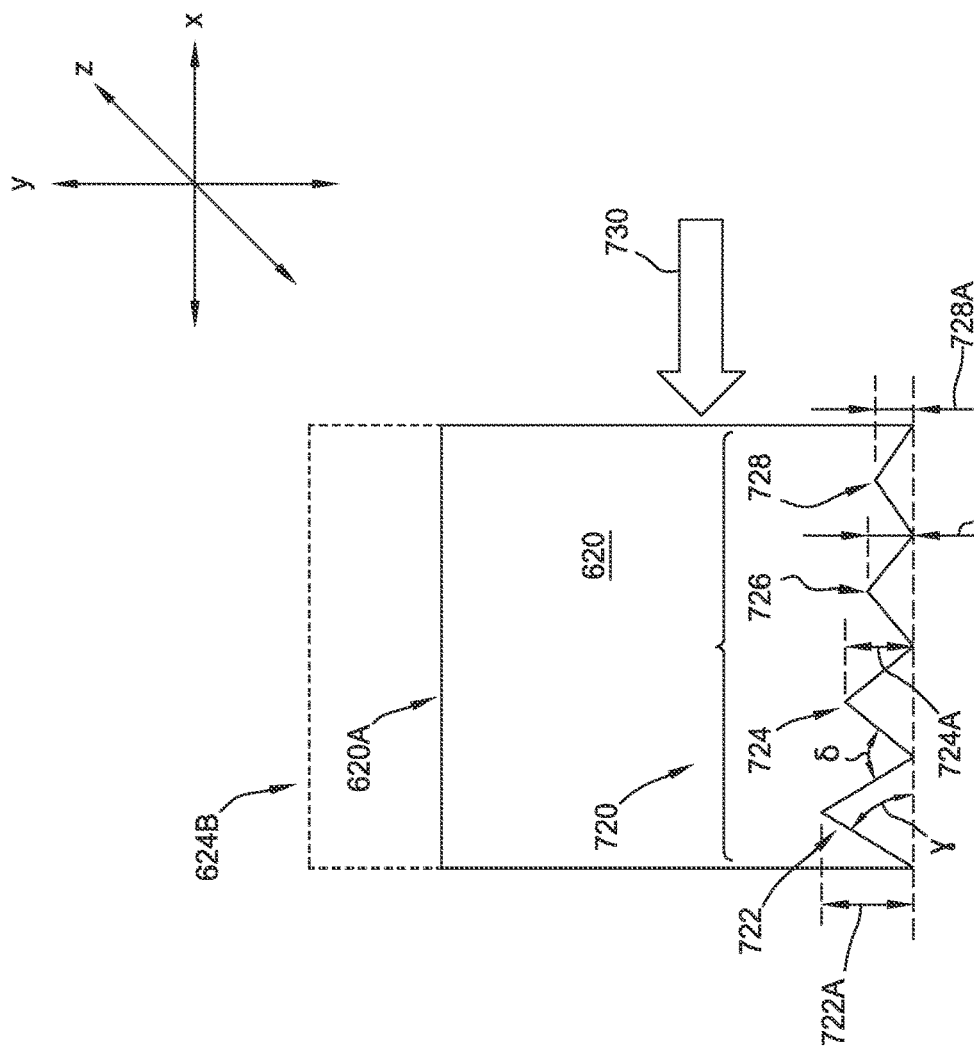
FIGS. 7A-7E depict examples of texturized targets according to aspects of the present disclosure.
Figure 7A:
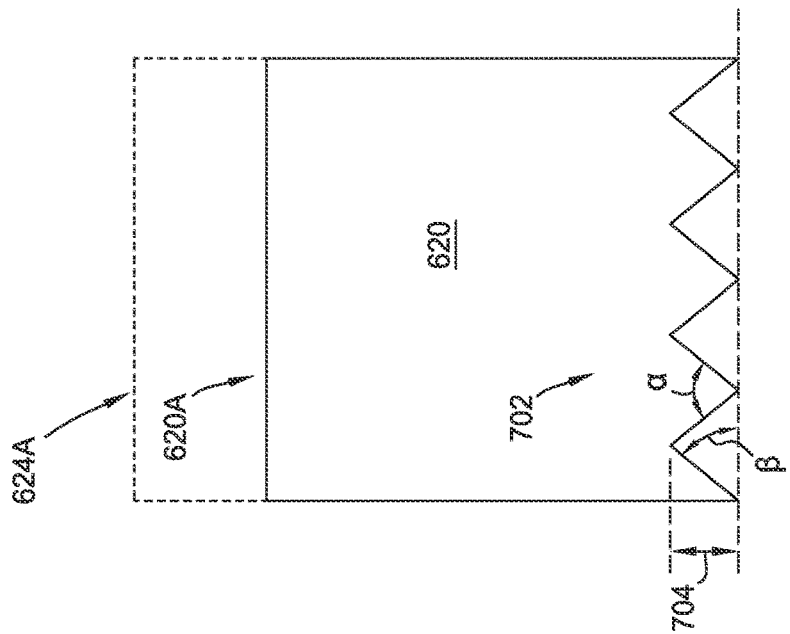

FIG. 7A shows a first portion 624A having a target 620 that includes a first surface 620A opposite a first textured surface 702. The first textured surface 702 includes a plurality of triangular formations having a first angle α and a second angle β and a height 704. In one example, the height 704 is from about 1 micron (μm) to about 0.1 millimeters (mm) (100 μm). In another example, the height 704 is from about 20 μm to about 80 μm. In another example, the height 704 is from about 30 μm to about 90 μm. In one example, which can be combined with other examples herein, the first angle α is from about 30 degrees (°) to about 120°. In another example, which can be combined with other examples herein, the first angle α is from about 450 to about 1000. In one example, which can be combined with other examples herein, the first angle α is from about 750 to about 90°. In one example, which can be combined with other examples herein, the second angle β is from about 20 degrees (°) to 85°. In another example, which can be combined with other examples herein, the second angle β is from about 250 to about 600. In one example, which can be combined with other examples herein, the second angle R is from about 300 to about 45°. While the triangular features of the first textured surface 702 are shown as each having the same height 704 in FIG. 7A, in other examples, as discussed in at least FIG. 7B below, the features could be formed at varying heights in an ordered or random arrangement.

FIG. 7B shows a second portion 624B having a target that includes a first surface 620A opposite a second textured surface 720. The second textured surface 720 includes a plurality of triangular formations having a first angle γ and a second angle β. In contrast to the first textured surface 702 in FIG. 7A, the second textured surface 720 includes a plurality of triangular formations of varying heights. In one example, a first height 722A of a first triangular feature 722 is from about 1 micron (μm) to about 0.1 millimeters (mm) (100 μm). In another example, the first height 722A is from about 20 μm to about 80 μm. In another example, the first height 722A is from about 30 μm to about 90 μm. Each of the adjacent triangular features has a height that is smaller than the height of the adjacent triangular feature. For example, a second height 724A of a second triangular feature 724 is less than the first height 722A. A third height 726A of a third triangular feature 726 is less than the second height 724A. A fourth height 728A of a fourth triangular feature 728 is less than the third height 726A. In one example, each height of a triangular feature can be less than an adjacent height by about 10%-70% of the adjacent height. In another example, each height of a triangular feature can be less than an adjacent height by about 15%-50% of the adjacent height. In yet another example, each height of a triangular feature can be less than an adjacent height by about 20%-40% of the adjacent height. Depending upon the example, each triangular feature of the second textured surface 720 can decrease in height (or increase) by equal or differing amounts (%) as compared to an adjacent triangular feature. In one example, UV light 730 can enter from a first direction along the x-axis. In other examples, the UV light 730 can enter along other directions as shown in the inset coordinate system that may be opposite of or perpendicular to the direction shown by the UV light 730. If the UV light 730 enters from a direction that is directly opposite to that shown in FIG. 7B, the second textured surface 720 may instead include a series of triangular features that increase in height from 722-728, in contrast to the decreasing height shown in the example in FIG. 7B.

In one example, which can be combined with other examples herein, the first angle γ is from about 30 degrees (°) to about 120°. In another example, which can be combined with other examples herein, the first angle γ is from about 450 to about 100°. In one example, which can be combined with other examples herein, the first angle γ is from about 750 to about 900. In one example, which can be combined with other examples herein, the second angle δ is from about 20 degrees (°) to 85°. In another example, which can be combined with other examples herein, the second angle δ is from about 25° to about 60°. In one example, which can be combined with other examples herein, the second angle δ is from about 30° to about 45°.

Figure 7E:
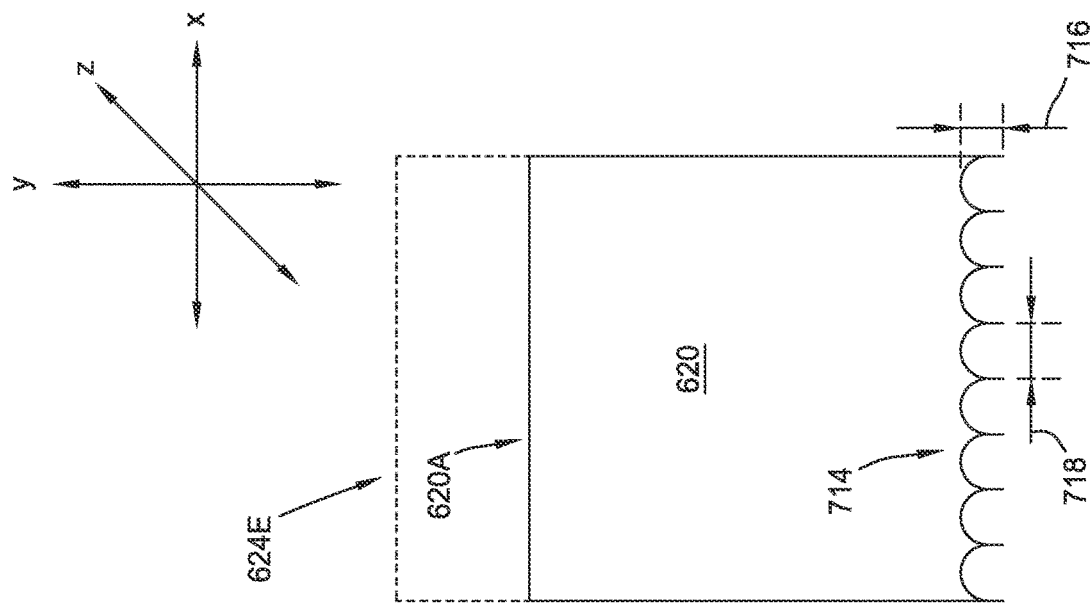
Figure 7D:
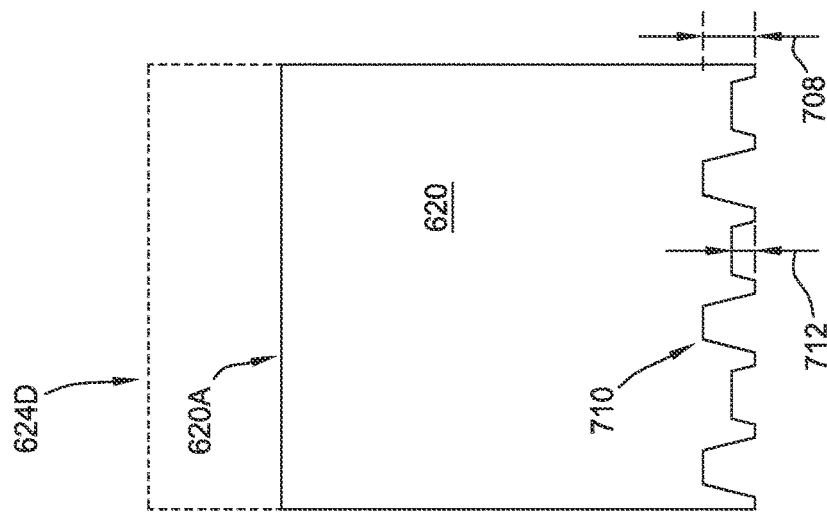
Figure 7C:
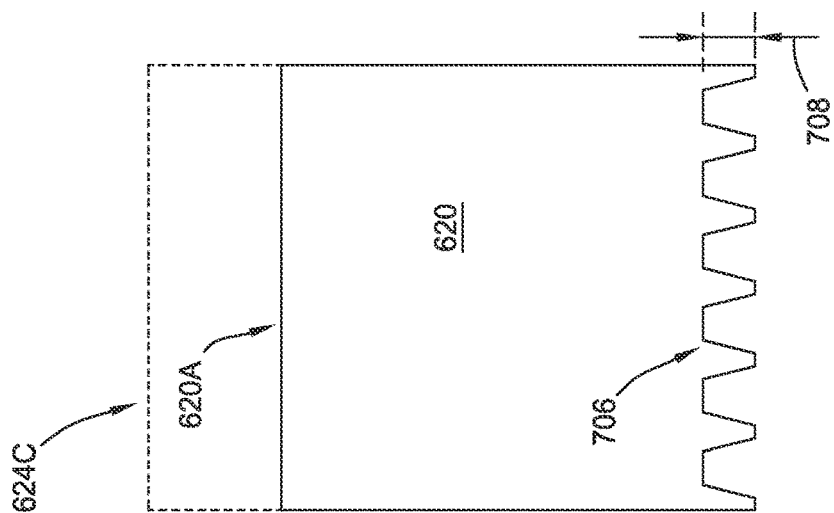

FIG. 7C shows a third portion 624C having a target 620 that includes a first surface 620A opposite a third textured surface 706. In contrast to the first portion 624A, the third textured surface 706 is formed from a plurality of polygonal structures having a height 708. In one example, the height 708 is from about 1 micron (μm) to about 0.1 millimeters (mm) (100 µm). In another example, the height 708 is from about 20 µm to about 80 µm. In another example, the height 708 is from about 30 µm to about 90 µm.

FIG. 7D shows a fourth portion 624D having a target 620 that includes a first surface 620A opposite a fourth textured surface 710. The fourth textured surface 710, in contrast to the third textured surface 706, has a plurality of polygonal structures having either a first height 708 or a second height 712, the second height 712 being less than the first height 708. In one example, the second height 712 is from about 10% to about 25% less than the first height 708. In another example, the second height 712 is from about 26% to about 50% less than the first height 708. In yet another example, which can be combined with other examples herein, the second height 712 is from about 51% to about 75% less than the first height 708. While features of alternating first height 708 and second height 712 are shown in FIG. 7C, in other examples, the features could be arranged in various height configurations other than the alternating spacing shown herein.

FIG. 7E shows a fifth portion 624E having a target 620 that includes a first surface 620A opposite a fifth textured surface 714. In contrast to the other textured surfaces discussed above, the fifth textured surface 714 includes a series of features, each having a smooth surface. The features of the fifth textured surface 714 have a height 716 and each have a width 718. In one example, the height 716 is from about 1 micron (µm) to about 0.1 millimeters (mm) (100 µm). In another example, the height 716 is from about 20 µm to about 80 µm. In another example, the height 716 is from about 30 µm to about 90 µm. In one example, the width 718 is from about 1 micron (µm) to about 0.1 millimeters (mm) (100 µm). In another example, the width 718 is from about 20 µm to about 80 µm. In another example, the width 718 is from about 30 µm to about 90 µm. In one example, a ratio of the height to the width (716:718) is from about 4:1 to about 1:4. In another example, the ratio of the height to the width (716:718) is from about 3:1 to about 1:3. In still another example, the ratio of the height to the width (716:718) is from about 2:1 to about 1:2.

While the features of the fifth textured surface 714 are shown as each having the same height 716 in FIG. 7E, in other examples, the features could be formed at varying heights in an ordered or random arrangement. In still other examples, the features of the fifth textured surface 714 may be separated by troughs that may be flat, angled, or rounded. The textures shown in FIGS. 7A-7E can, in some examples, be used in combination. In some examples, the textures can be used to form the indicators discussed herein that can include graphics and/or texts to indicate that the target is UV cleaned and/or to indicate a brand identifier. Further, the textured surfaces discussed in FIGS. 7A-7E are discussed with respect to being used in targets, but may also be present in a reflector associated with either a UV light source or a target in order to direct UV light to clean various surfaces of the target. As discussed above with respect to FIG. 7B, the UV light can enter the targets (620) shown in FIGS. 7A and 7C-7E along the x-axis, y-axis, z-axis, or at angles in between these axes, depending upon the configuration of the cleaning system in which the targets (620) are incorporated.

Accordingly, the cleaning systems and methods of cleaning herein can be used to disinfect targets so that users of contact elements coupled to the targets may make direct contact with the UV-cleaned targets instead of the contact elements. The targets are configured to be both repairable and replaceable, such that the contact elements are not damaged when the targets are removed for repair or replacement. The targets can be customized with reflectors, absorbers, or to have various geometries, textures, tints, or indicators for numerous applications associated with a wide breadth of both contact elements and installation environments. Light directing elements can be further included in the cleaning systems discussed herein as a part of the UV light source, or positioned remotely relative to either or both of the target and the UV light source. The users can see, or in some cases feel, depending upon where the indicator is located and the vision abilities of the user, that the target is UV-cleaned, thus enabling confidence in the cleanliness of at least some aspects of an installation environment in which the cleaning system is located.

In the present disclosure, reference is made to various aspects. However, it should be understood that the present disclosure is not limited to specific described aspects. Instead, any combination of the above features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Additional Aspects

Clause 1. A cleaning system, comprising: a target (104) being at least 30% transparent to UV light in a wavelength range from about 222 nanometers (nm) to about 300 nm; and a contact element (112) being removably coupled to the target (104) and configured to cause motion of the contact element (112) in response to force being applied to the target (104).

Clause 2. The cleaning system of Clause 1, wherein the target (104) is at least about 30% transparent to UV light.

Clause 3. The cleaning system of Clause 1 or 2, wherein the target (104) is from about 50% transparent to UV light to about 75% transparent to the UV light.

Clause 4. The cleaning system of any of Clauses 1 to 3, wherein the target (104) comprises a transparent material having a UV transmission of from about 95 to about 99.15%.

Clause 5. The cleaning system of any of Clauses 1 to 4, wherein the transparent material comprises borosilicate glass.

Clause 6. The cleaning system of any of Clauses 1 to 5, wherein the target (104) is from about 0.2 millimeters (mm) to about 20 centimeters (cm) in thickness.

Clause 7. The cleaning system of any of Clauses 1 to 6, wherein a target (104) is directly coupled to the contact element (112) via an adhesive, a mechanical coupling, a magnetic coupling, a press-fit coupling, or combinations thereof.

Clause 8. The cleaning system of any of Clauses 1 to 7, wherein a target (104) is indirectly coupled to the contact element (112) via a fixture (106).

Clause 9. The cleaning system of any of Clauses 1 to 8, further comprising a component (106) in direct contact with and removably coupled to each of the contact element (112) and the target (104).

Clause 10. The cleaning system of any of Clauses 1 to 9, further comprising: an ultraviolet (UV) light source (102) configured to emit UV light in a wavelength range from about 222 nm to about 254 nm.

Clause 11. The cleaning system of Clause 10, further comprising: a first reflector (616) configured to reflect the UV light on to at least one surface of the target (104).

Clause 12. The cleaning system of Clause 11, wherein the first reflector (616) is formed from a fluoropolymer.

Clause 13. The cleaning system of Clause 11, wherein the first reflector (616) is formed from a material including a plurality of pores, each pore having a maximum diameter less than 222 nm.

Clause 14. The cleaning system of Clause 10, wherein the target (104) includes at least one target absorber (420) configured to absorb UV light subsequent to the UV light passing through at least one surface of the target (104).

Clause 15. The cleaning system of any of Clauses 1 to 14, wherein the target (104) includes a second reflector (612) configured to reflect the UV light received from the UV light source (102) in at least one direction through the target (104) to direct the UV light towards at least one other surface of the target (104).

Clause 16. A cleaning system, comprising: an ultraviolet (UV) light source (102) configured to emit a UV light in a wavelength range from about 222 nm to about 300 nm; a target (104) being at least 30% transparent to UV light in a wavelength range from about 222 nanometers (nm) to about 300 nm; and a contact element (112) being removably coupled to the target (104) and configured to cause motion of the contact element (112) in response to force being applied to the target (104).

Clause 17. The cleaning system of Clause 16, wherein the target (104) comprises a transparent material having a transmission of from about 95 to about 99.15%.

Clause 18. The cleaning system of Clause 16 or 17, wherein the transparent material comprises borosilicate glass.

Clause 19. The cleaning system of any of Clauses 16 to 18, further comprising a non-transitory medium (108) configured to store a plurality of logic executable by a processor and including an at least one cleaning program.

Clause 20. The cleaning system of Clause 19, further comprising a sensor (110) configured to detect a triggering event and the at least one cleaning program being configured to emit the UV light in response to the sensor (110) detecting the triggering event.

Clause 21. The cleaning system of Clause 20, wherein the sensor (110) is associated with the target (104).

Clause 22. The cleaning system of Clause 20, wherein the sensor (110) is associated with the UV light source (102).

Clause 23. The cleaning system of Clause 20, wherein the sensor (110) is a type selected from a temperature sensor, a pressure sensor, a timer, and combinations thereof.

Clause 24. A method of cleaning, comprising: detecting (202), by a sensor associated with an ultraviolet (UV) cleaning system, a first triggering event; and executing (204), by a processor, in response to detecting the first triggering event, a cleaning program to clean a target, wherein executing the cleaning program comprises: activating a UV light source of the UV cleaning system for a predetermined period of time, the UV light source being configured to emit to emit a UV light in a wavelength range from about 222 nm to about 300 nm to clean the target.

Clause 25. The method of Clause 24, further comprising: subsequent to executing (204) the cleaning program, engaging (208) a contact element coupled to the target.

Clause 26. The method of Clause 24 or 25, further comprising storing (216) a first time associated with detecting the first triggering event, and a second time associated with executing the cleaning program, on a data store (114), the data store (114) being in wireless communication with the UV cleaning system.

Clause 27. The method of any of Clauses 24 to 26, wherein activating the UV light source comprises causing the UV light source to emit UV light to clean at least one surface of a plurality of surfaces of the target.

Clause 28. The method of any of Clauses 24 to 27, further comprising: reflecting, by a reflector coupled to the target, the UV light received from the UV light source to clean the target (206).

Clause 29. The method of Clause 28, further comprising: configuring the UV light source to emit the UV light to clean a first surface of a plurality of surfaces of the target (206); and configuring the reflector to reflect the UV light through a second surface of the plurality of surfaces to clean the second surface (206).

Clause 30. The method of any of Clauses 24 to 29, wherein executing (204) the cleaning program further comprises: activating the UV light source for the predetermined period of time, the UV light source being configured to emit a predetermined range of wavelengths to clean (206) a plurality of targets within a predetermined proximity of the UV light source.

Clause 31. The method of any of Clauses 24 to 30, wherein the first triggering event comprises: a predetermined time associated with a schedule; an activation of a contact element associated with a target; a predetermined time associated with a previous emission of UV light from the UV light source, or combinations thereof.

While the foregoing is directed to aspects of the present disclosure, other and further aspects of the disclosure may be devised without departing from the basic scope thereof, and the scope thereof is determined by the claims that follow.

What is claimed is:

1. A cleaning system, comprising:
a target comprising more than one surfaces, wherein at least a portion of a first surface of the more than one surfaces comprises a target absorber configured to absorb ultraviolet (UV) light subsequent to the UV light passing through a second surface of the more than one surfaces, the target being at least 30% transparent to ultraviolet (UV) light in a wavelength range from about 222 nanometers (nm) to about 300 nm;
a contact element being removably coupled to the target, wherein the target is configured to cause motion of the contact element in response to force being applied to the target; and
a component in direct contact with and removably coupled to each of the contact element and the target.

2. The cleaning system of claim 1, wherein the target is at least about 40% transparent to UV light.

3. The cleaning system of claim 1, wherein the target is from about 50% transparent to UV light to about 75% transparent to the UV light.

4. The cleaning system of claim 1, wherein the target comprises a transparent material having a UV transmission of from about 95 to about 99.15%.

5. The cleaning system of claim 4, wherein the transparent material comprises borosilicate glass.

6. The cleaning system of claim 1, wherein the target is from about 0.2 millimeters (mm) to about 20 centimeters (cm) in thickness.

7. The cleaning system of claim 1, wherein the target is directly coupled to the contact element via an adhesive, a mechanical coupling, a magnetic coupling, a press-fit coupling, or combinations thereof.

8. The cleaning system of claim 1, wherein a target is indirectly coupled to the contact element via a fixture.

9. The cleaning system of claim 1, further comprising: a UV light source configured to emit the UV light in a wavelength range from about 222 nm to about 254 nm.

10. The cleaning system of claim 9, further comprising: a first reflector configured to reflect the UV light on to at least one surface of the target.

11. The cleaning system of claim 10, wherein the first reflector is formed from a fluoropolymer.

12. The cleaning system of claim 10, wherein the first reflector is formed from a material including a plurality of pores, each pore having a maximum diameter less than 222 nm.

13. The cleaning system of claim 10, wherein the target includes a second reflector configured to reflect the UV light received from the UV light source in at least one direction through the target to direct the UV light towards at least one other surface of the target.

14. The cleaning system of claim 1, wherein the target comprises a third surface of the more than one surfaces, wherein the third surface comprises a textured surface.

15. The cleaning system of claim 14, wherein the textured surface extends across the entire third surface.

16. The cleaning system of claim 1, wherein the first surface and the second surface are parallel to each other or orthogonal to each other.

17. A cleaning system, comprising:
an ultraviolet (UV) light source configured to emit a UV light in a wavelength range from about 222 nm to about 300 nm;
a target comprising more than one surfaces, wherein at least a portion of a first surface of the more than one surfaces comprises a target absorber configured to absorb the UV light subsequent to the UV light passing through a second surface of the more than one surfaces, the target being at least 30% transparent to UV light in a wavelength range from about 222 nanometers (nm) to about 300 nm;

a contact element being removably coupled to the target, wherein the target is configured to cause motion of the contact element in response to force being applied to the target; and a component in direct contact with and removably coupled to each of the contact element and the target.

18. The cleaning system of claim 17, wherein the target comprises a transparent material having a transmission of from about 95 to about 99.15%.

19. The cleaning system of claim 17, further comprising a non-transitory medium configured to store a plurality of logic executable by a processor and including an at least one cleaning program.

20. The cleaning system of claim 19, further comprising a sensor configured to detect a triggering event and the at least one cleaning program being configured to emit the UV light in response to the sensor detecting the triggering event.

* * * * *

UNITED STATES PATENT AND TRADEMARK OFFICE
CERTIFICATE OF CORRECTION

| | | |
|---|---|---|
| PATENT NO. | : 12,440,588 B2 | Page 1 of 1 |
| APPLICATION NO. | : 17/480950 | |
| DATED | : October 14, 2025 | |
| INVENTOR(S) | : Jamie J. Childress | |

It is certified that error appears in the above-identified patent and that said Letters Patent is hereby corrected as shown below:

In the Claims

In Column 28, Line 30: "directly coupled" should be -- coupled --.

Signed and Sealed this
Twenty-seventh Day of January, 2026

John A. Squires
*Director of the United States Patent and Trademark Office*